(12) United States Patent
Goldstein et al.

(10) Patent No.: US 7,257,168 B2
(45) Date of Patent: Aug. 14, 2007

(54) PILOTLESS, WIRELESS, TELECOMMUNICATIONS APPARATUS, SYSTEMS AND METHODS HAVING EQUALIZATION

(75) Inventors: Yuri Goldstein, Southbury, CT (US); Yuri Okunev, Southbury, CT (US)

(73) Assignee: PCTEL, Inc., Chicago, IL (US)

( * ) Notice: Subject to any disclaimer, the term of this patent is extended or adjusted under 35 U.S.C. 154(b) by 722 days.

(21) Appl. No.: 10/638,980

(22) Filed: Aug. 12, 2003

(65) Prior Publication Data

US 2005/0026565 A1     Feb. 3, 2005

Related U.S. Application Data

(62) Division of application No. 10/628,943, filed on Jul. 29, 2003.

(51) Int. Cl.
*H03K 9/00* (2006.01)
(52) U.S. Cl. .................. 375/316; 375/261; 375/326
(58) Field of Classification Search ............. 375/316, 375/261, 326
See application file for complete search history.

(56) References Cited

U.S. PATENT DOCUMENTS

| | | | | |
|---|---|---|---|---|
| 6,904,098 | B1 * | 6/2005 | Isaksen et al. ............. | 375/261 |
| 6,952,458 | B1 * | 10/2005 | Djokovich et al. ......... | 375/341 |
| 2002/0159551 | A1 * | 10/2002 | Ekvetchavit et al. ....... | 375/350 |
| 2003/0152157 | A1 * | 8/2003 | Antoine et al. ............ | 375/260 |
| 2004/0125740 | A1 * | 7/2004 | Gardner ..................... | 370/208 |

OTHER PUBLICATIONS

*Wireless LAN Medium Access Control (MAC) and Physical Layer (PHY) Specifications in the 5 Ghz Band*, IEEE Standard 802.11a, §§ 17.1 through 17.1.2.4, 17.2, 17.3. & 17.5.
*Standard Air Interface for Fixed Broadband Wireless Access Systems—Media Access Control Modifications and Additional Physical Layer for 2-11 GHz.*, IEEE Standard 802.16ab, Part 16, §§ 8.3.5 through 8.3.5.1.5 & 8.3.5.3.4.
*HiperLAN2; Broadband Wireless Communications at 5 Ghz*, P. Schramm et al., IEEE , vol. 40, No. 6, Jun. 2002.
*Minimum BER Power Loading for OFDM in Fading Channel*, L Goldfeld et al., IEEE Transactions on Communications, vol. 50, N11, 2002.
*Digital Communications*, J. Proakis, 4th Edition, McGraw-Hill, 2001, §§ 5.2.9, 6.2 & 14.5.
*Turbo Coding for Fading Channels*. B. Vucetic and J. Yuan, Kluwer Academic Publishers, 2001, §8.5.1.

* cited by examiner

*Primary Examiner*—David C. Payne
*Assistant Examiner*—Erin M. File
(74) *Attorney, Agent, or Firm*—Gordon & Jacobson, PC

(57) ABSTRACT

Systems, methods and apparatus are provided for equalizing a received multicarrier wireless telecommunications data signal. The wireless signal includes data without accompanying pilot signals, and equalization is accomplished by extracting information from the data, by processing the information in order to obtain equalization indications, and by equalizing the multicarrier wireless telecommunications data signal by modifying indications of the wireless telecommunications data signal using the equalization indications.

11 Claims, 12 Drawing Sheets

Fig.1 Example of signals in 2-dimension space

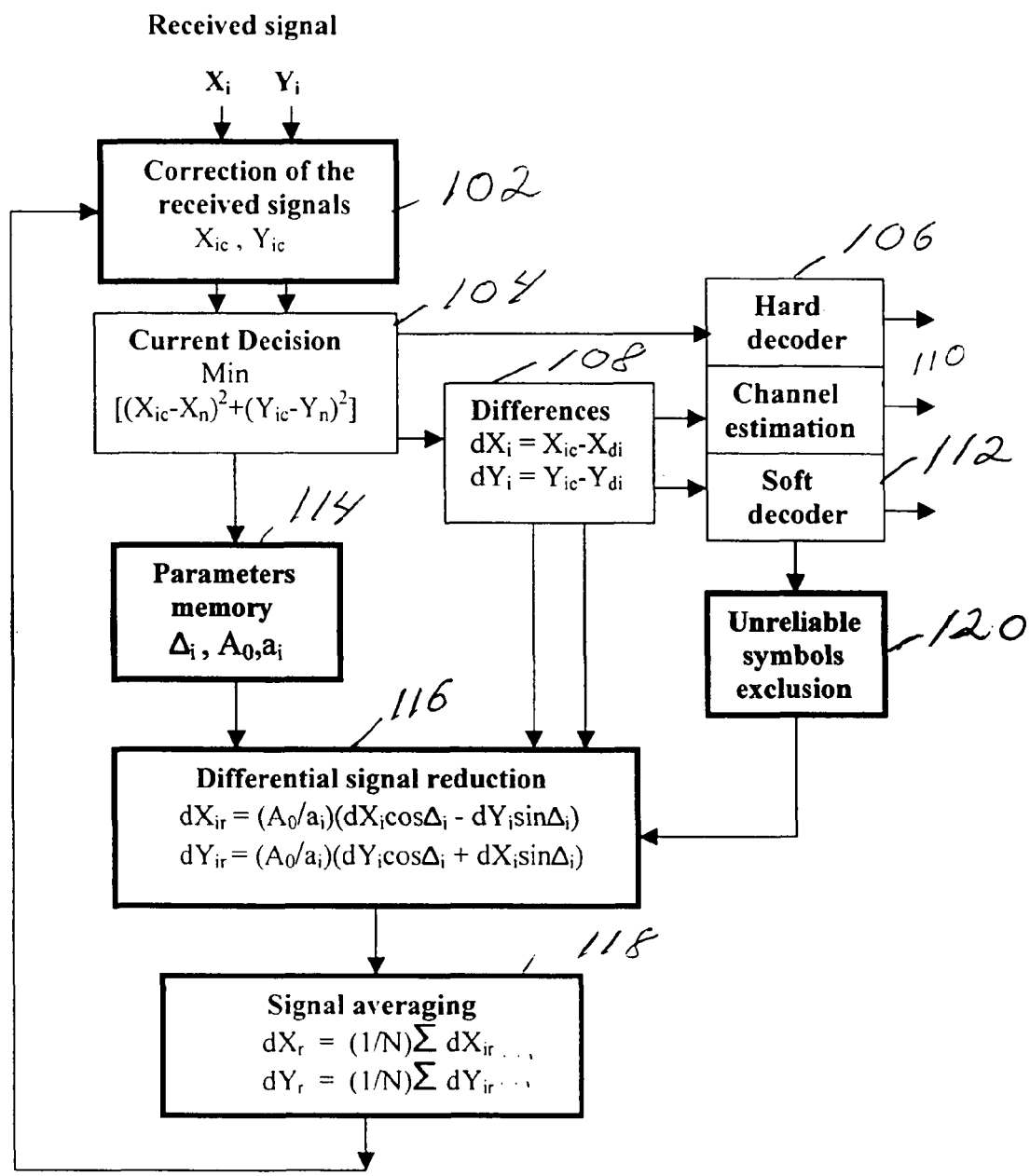
Fig.5 Correction of the received signal, based on reduction and averaging differential quadrature components of the received signals Fig.6 Correction of the constellation point coordinates, based on reduction and averaging differential quadrature components of the received signals
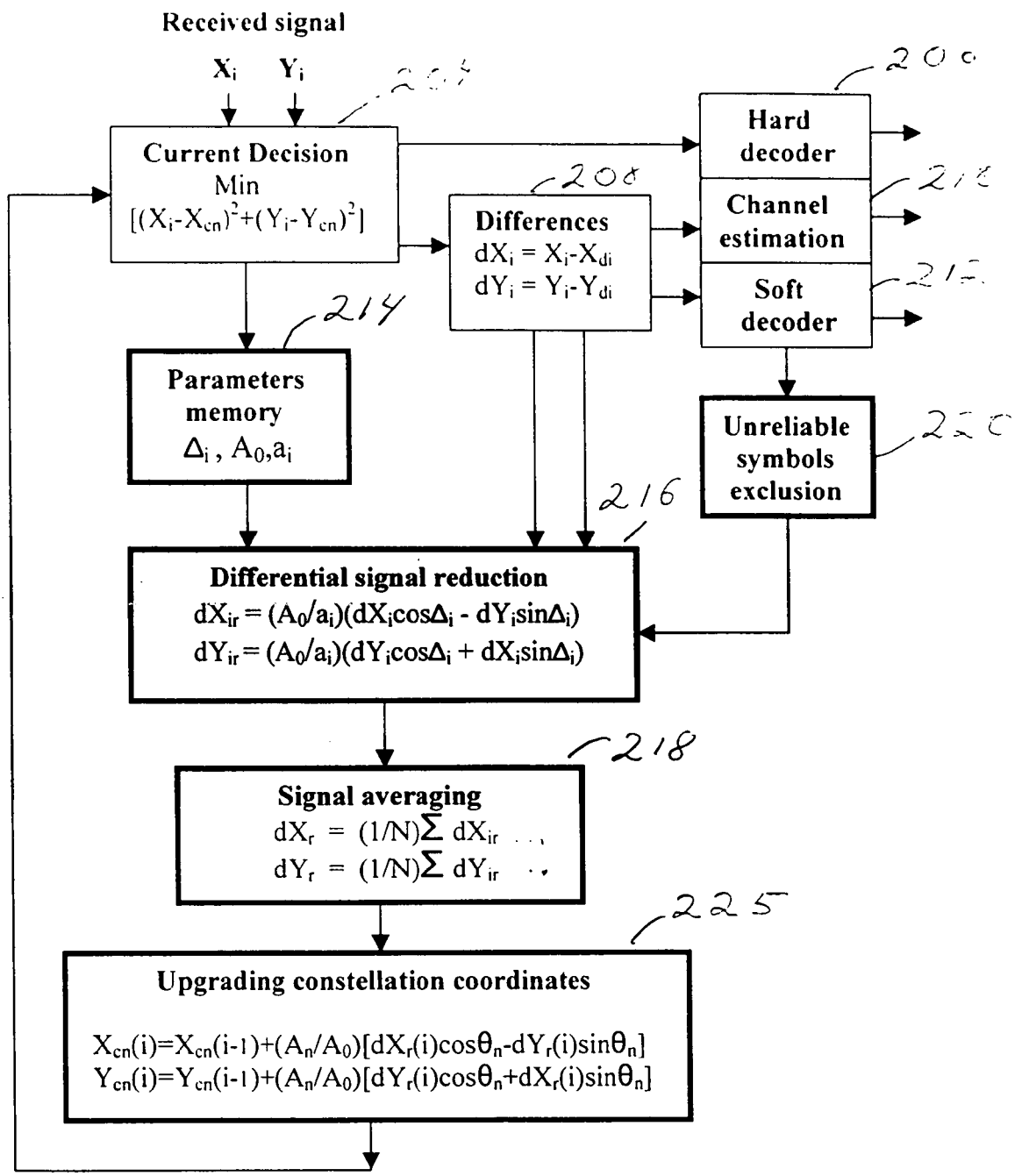

Fig.7 Correction of the received carriers in multicarrier system with correlated phase shifts, based on differential quadrature components of the received carriers
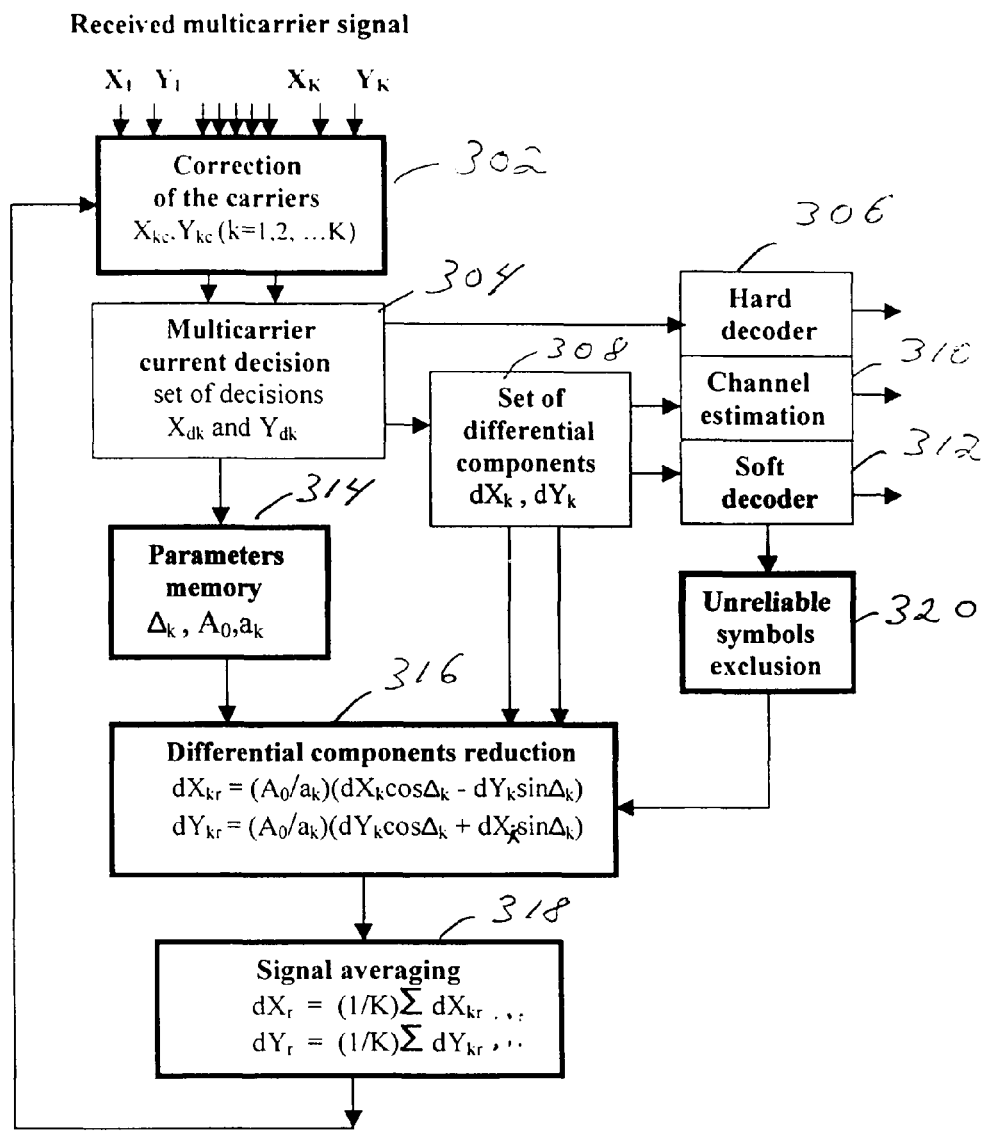

Fig.8 Correction of the constellation point coordinates in a multicarrier system with correlated phase shifts, based on differential quadrature components of the received carriers.
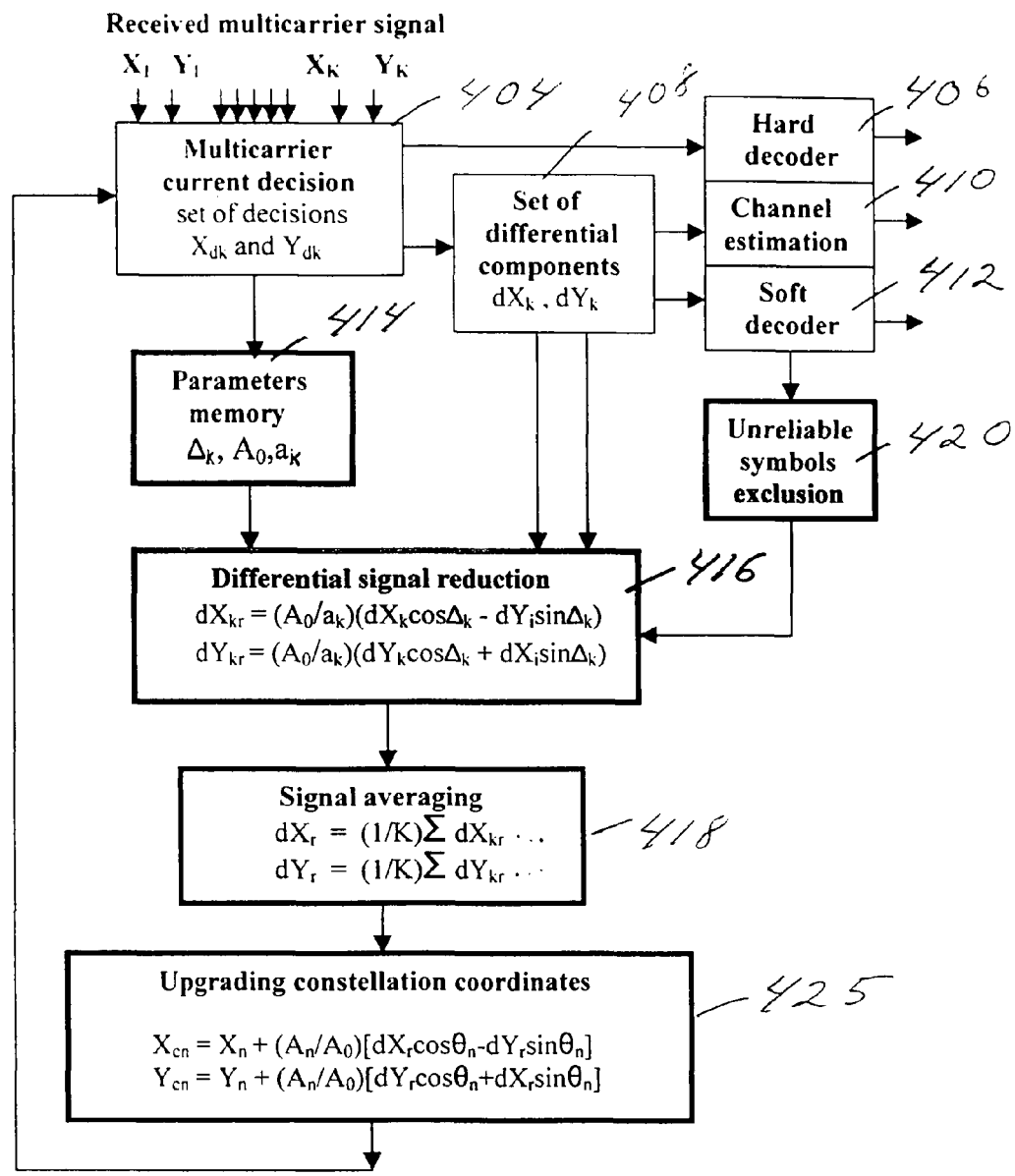

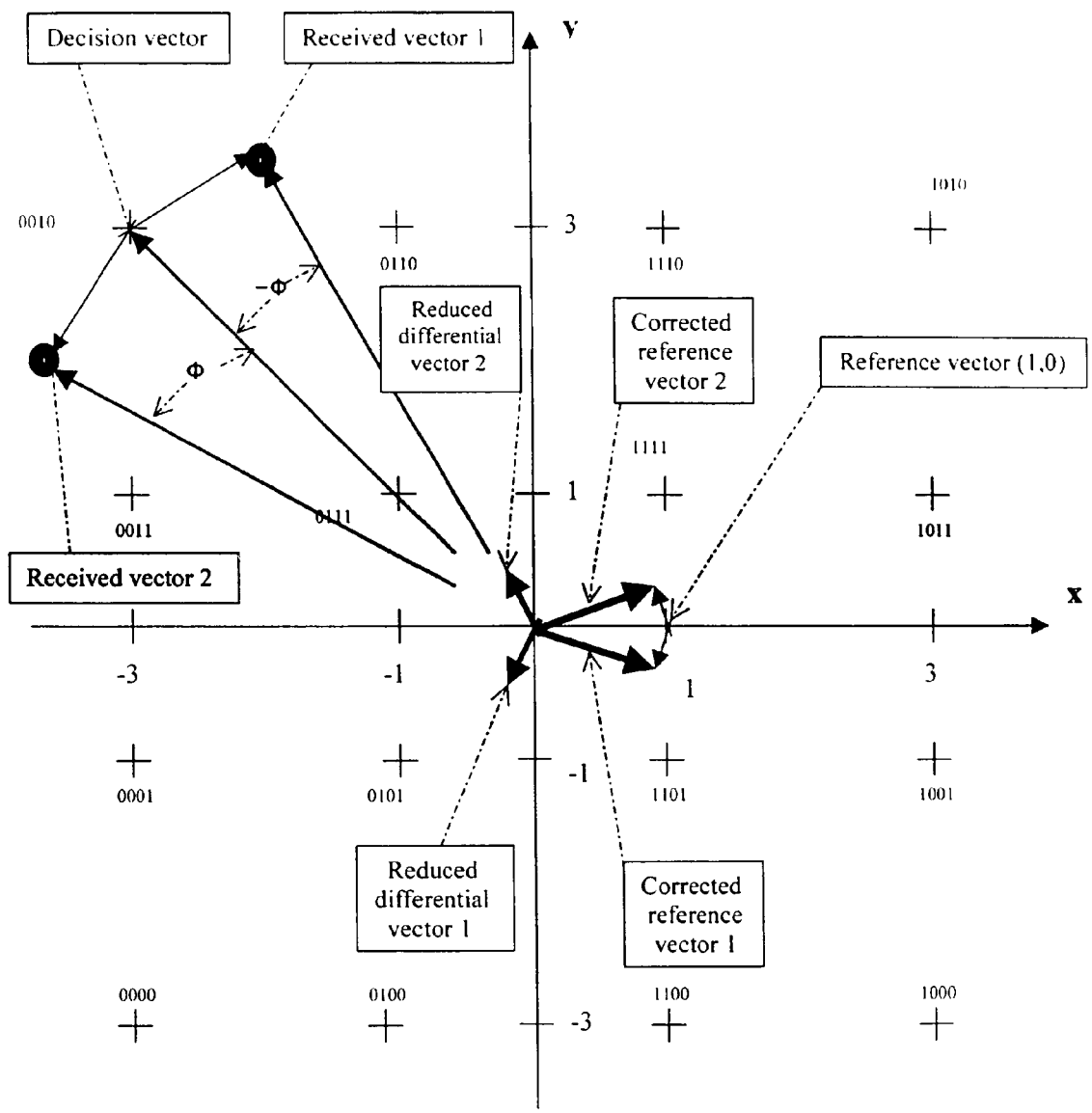
Fig. 9 Illustration to the simplified algorithms of phase correction.

Fig. 10 Simplified carrier phase correction in multicarrier systems, based on the quadrature differential components.
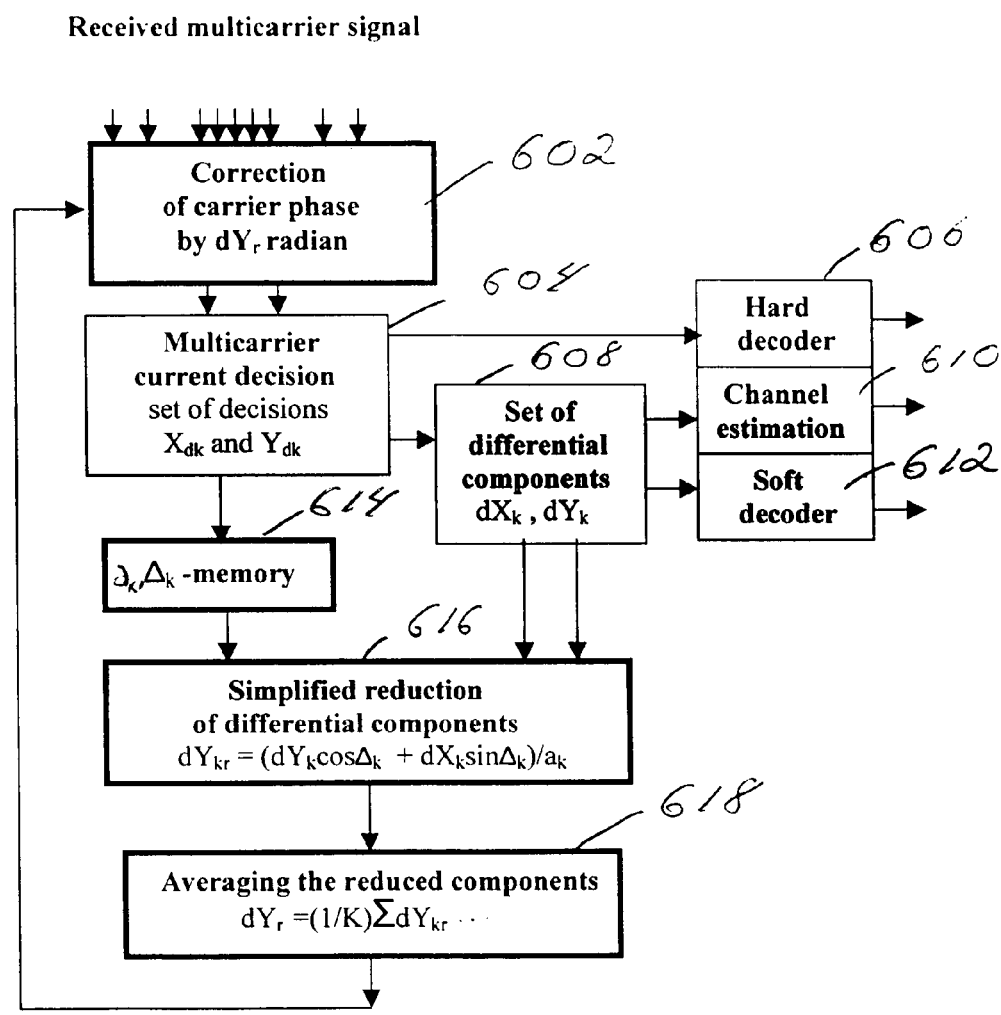

Fig. 11 Majority algorithm of carrier phase correction in multicarrier systems, based on the quadrature differential components.
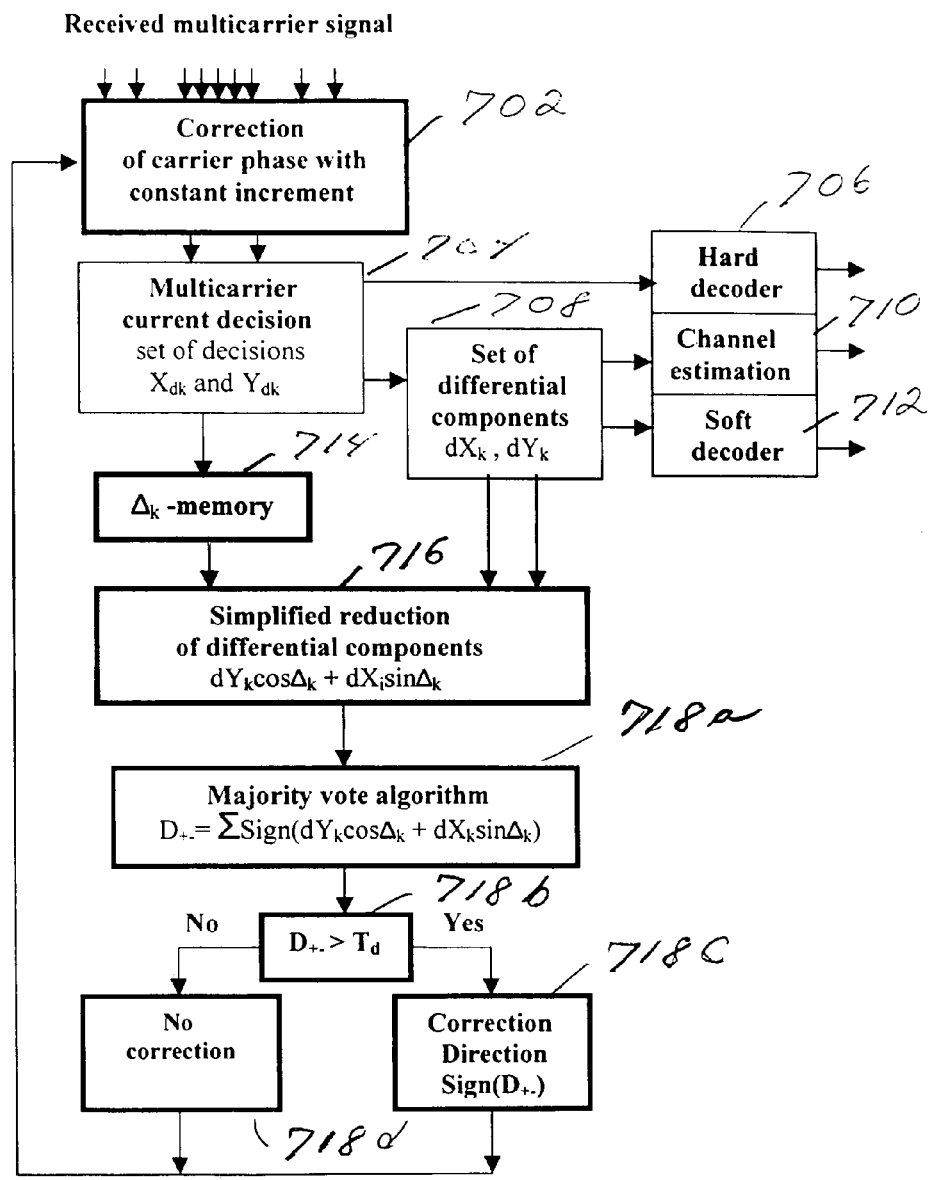

Fig. 12 Per-carrier adaptive equalizer, based on estimates of differential quadrature components.
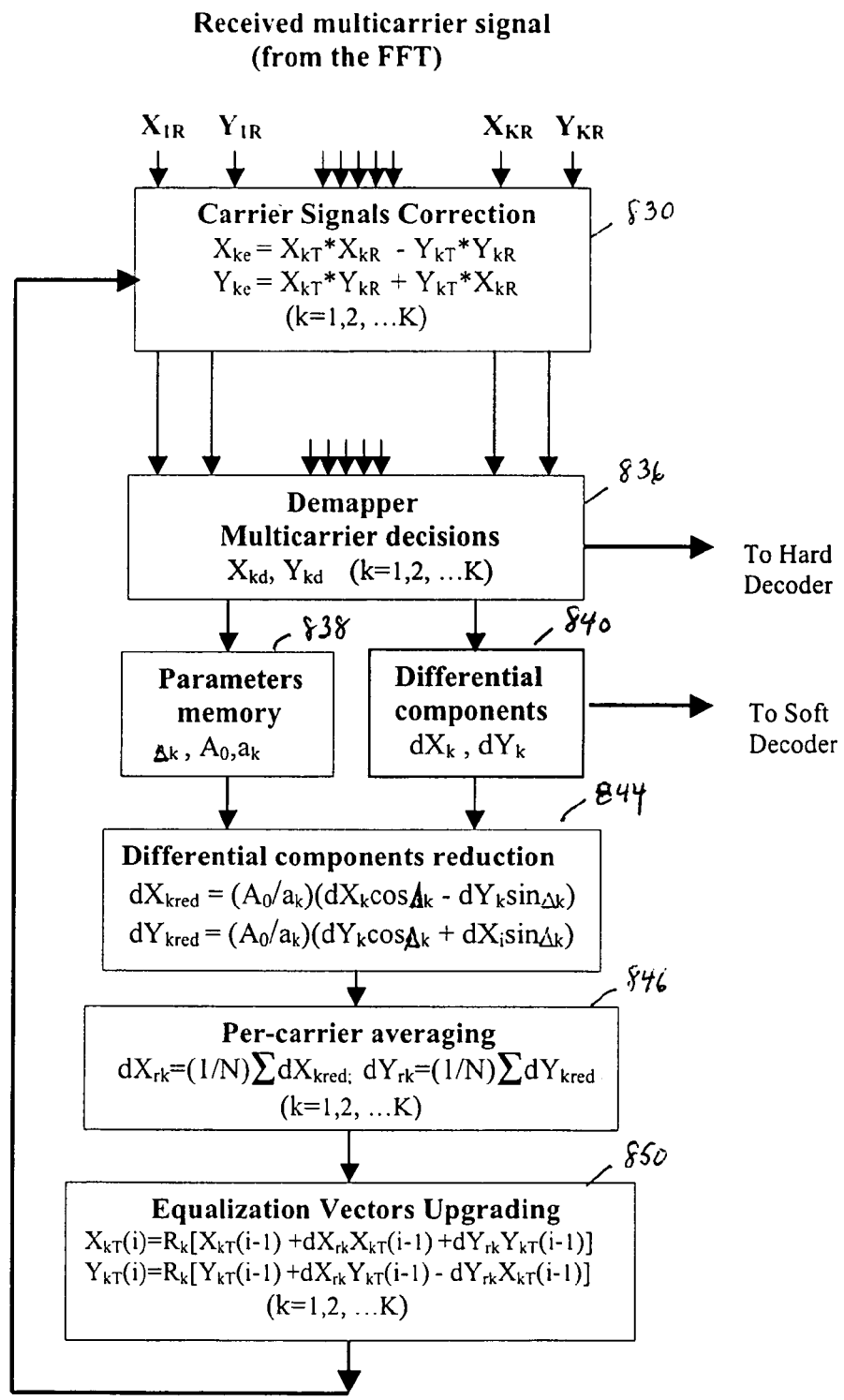

PILOTLESS, WIRELESS, TELECOMMUNICATIONS APPARATUS, SYSTEMS AND METHODS HAVING EQUALIZATION

This is a divisional of U.S. Ser. No. 10/628,943 filed Jul. 29, 2003.

BACKGROUND OF THE INVENTION

1. Field of the Invention

The present invention relates to telecommunications. The invention more particularly relates to wireless telecommunications apparatus, systems and methods which implement data transmission via a plurality of telecommunication channels such as radio channels with variable parameters. More specifically, the invention relates to wireless systems with multicarrier transmission, although it is not limited thereto.

2. State of the Art

In wireless data transmission systems, a signal is subjected to several frequency conversions with respective shifting of its carrier frequency and initial phase. In mobile systems, the carrier frequency is additionally subjected to the Doppler effect. In addition, the signal phase at the receiving point depends on the time interval of radio signal propagation in the communication channel, and this time interval is changed because of both the change of the signal propagation path and the change of properties and parameters of the propagation media. In wireless multipath channels, the change of any single interference component (its amplitude or/and phase) causes the change of the received signal phase as a whole. As a result, the initial signal phase has a constant component and a varying, typically slowly changing component. Usually, in wireless systems, the constant component is compensated in the receiver during the preamble by estimating frequency offset and frequency equalizer adjustment utilizing a special pilot signal.

Optimal signal processing in data transmission systems and wireless telecommunication systems is based on certain a priori information about received signals and channel characteristics. This information includes symbol time interval, carrier initial phase, signal attenuation, signal-to-noise ratio and other service parameters, which are extracted from the received signal by means of special functions such as clock synchronization, carrier recovery, signal equalization, channel estimation, etc. In channels with variable characteristics, such as multipath wireless channels, the above-mentioned service parameters change over time, and their estimation, in order to remain current, requires special adaptive or tracking procedures.

Typically in wireless systems, service parameter estimation and tracking are based on utilization of special pilot signals. Two types of pilot signals are usually used: preamble pilots transmitted during a preamble before data transmission, and accompanying pilots transmitted during the whole communication session in parallel with data transmission. As a rule, these two types of pilots have not only different parameters but also provide different functions.

The preamble pilot consists of few symbols and takes a comparatively small part of the communication session. It is used for automatic gain control (AGC), clock synchronization, initial frequency offset correction, preliminary carrier phase adjustment, as well as for channel parameters estimation. For example, in a WLAN system according to the IEEE802.11a standard, the preamble pilot contains two training sequences: a short training sequence, and a long training sequence. The short training sequence consists of ten short OFDM symbols with duration 0.8 µs, and the long training sequence consists of two long OFDM symbols with duration 3.2 µs. Each short OFDM symbol is a sum of twelve phase-modulated carriers with numbers: 2, 6, 10, 14, 18,. 22, 26, 30, 34, 38, 42, 46, 50. Each long OFDM symbol is a sum of all fifty-two phase modulated carriers. The short and long training sequences are separated by a guard interval with a duration of 1.6 µs. The total duration of the preamble pilot signal (training signal) is 16 µs, which is 80% of a whole service signal, transmitted before data, but it is a very small part of the communication session as a whole.

The IEEE standard specifies that the short training sequence should be "used for AGC convergence, diversity selection, timing acquisition, and coarse frequency acquisition in the receiver", and the long training sequence should be "used for channel estimation and fine frequency acquisition in the receiver" (Section 17.3.2.1). So, the preamble pilot, as a rule, does not considerably decrease the average data rate of the system (system capacity), and this type of pilot signal is not the focus of this invention.

In contrast to the preamble pilot signal, the accompanying pilot signals are usually transmitted during the whole communication session in parallel with data transmission. The accompanying pilot signals are typically used for adaptive equalization, for frequency offset tracking, and for current adjustment of carrier phases to provide improved coherent signal processing. For example, in the WLAN system according to the IEEE802.11a standard, the accompanying pilot signal consists of four pseudo-randomly modulated carriers. The standard specifies: "In each OFDM symbol, four of the carriers are dedicated to pilot signals in order to make coherent detection robust against frequency offset and phase noise. These pilot signals shall be put in carriers –21, –7, 7, 21. The pilots shall be BPSK modulated by a pseudo binary sequence to prevent the generation of spectral lines" (Section 17.3.5.8). So, in the OFDM WLAN system forty-eight carriers are used for data transmission and four carriers are dedicated to pilot signals; i.e., about 8% of the system capacity, as well as transmitter power, is used for pilot signal transmission.

Approximately the same portion of the system capacity is wasted in the fixed wireless broadband systems according to the IEEE802.16 standard (Section 8.3.5.3.4), in which one constant pilot carrier is used per twelve data carriers.

It should be noted that a decreasing real data rate is not the only disadvantage of pilot utilization. When using frequency spaced (i.e., frequency-separated) pilots for phase adjustment of the carrier signals, the accuracy of the phase adjustment is not sufficient for perfect coherent processing, especially in multipath wireless channels. As a matter of fact, the phases of the frequency spaced carriers are not 100% correlated. Therefore, even if the estimation of a pilot phase is perfect, the estimation of an adjacent carrier phase may be not correct. Taking into account this fundamental disadvantage of pilot systems, the authors of the IEEE802.16 standard have proposed to use variable location pilot carriers in addition to the constant location pilot carriers. Variable pilots shift their location each symbol with a cyclic appearance. This technique allows a receiver to improve phase tracking accuracy, but it leads to complicated synchronization and additional capacity loss.

It should also be noted that existing approaches to pilotless phase tracking system design are based on carrier recovery techniques. See, J. Proakis, "Digital Communications", 4th edition, McGraw-Hill, 2001, Section 6.2. Carrier recovery techniques provide individual phase tracking for each carrier. They provide simple and efficient solution for single carrier systems with small-size constellations, but they are practically unacceptable for multicarrier systems with multipoint QAM constellations.

SUMMARY OF THE INVENTION

It is therefore an object of the invention to provide apparatus, systems and methods which implement pilotless telecommunications.

It is another object of the invention to provide pilotless telecommunication systems which provide desired receiving functions.

It is a further object of the invention to provide pilotless telecommunications systems which extract information from signal-bearing data in order to conduct one or more of adaptive equalization, frequency offset tracking, and current adjustment of carrier phases to provide improved coherent signal processing.

It is an additional object of the invention to provide pilotless telecommunication systems which transmit data without any pilot signals and can therefore use all system bandwidth exclusively for data transmission, while still providing all receiving functions based on extraction of all necessary information from signal-bearing data.

Another object of the invention is to provide general methods and apparatus for pilotless frequency offset compensation and carrier phase tracking necessary for optimal coherent processing of the received signals in single-carrier and multi-carrier systems with different modulation techniques, including any type of QAM constellations.

A further object of the invention is to provide simplified methods and apparatus for pilotless frequency offset compensation and carrier phase tracking in multicarrier systems with correlated between-carrier phases.

An additional object of the invention is to provide methods and apparatus for pilotless adaptive per-carrier equalization in multicarrier systems.

Yet another object of the invention is to provide pilotless signal equalization, frequency offset compensation, as well as carrier phase tracking based on algorithms which do not require complex signal processing and can be implemented utilizing the existing demodulation and decoding apparatus.

In accord with the objects of the invention, the present invention broadly provides systems, methods and apparatus which transmit signal-bearing data without accompanying pilot signals and which provide receiving functions based on extraction of information from the signal-bearing data. Among these functions are frequency offset compensation and carrier phase tracking.

According to one embodiment of the invention, an optimal (in terms of minimum variance of phase estimates) algorithm of phase adjustment is implemented in a pilotless system, method, and apparatus by reducing and averaging differential quadrature components of the received signal. A "differential quadrature component" is defined as the difference between the corresponding quadrature components of a received signal and a decision signal. "Reduction" of differential quadrature components of the received signal consists of a linear transformation of the received signal to the likely differential components of a reference signal, which may be any predetermined vector. Averaging of differential components of the reference signal provides nonbiased and efficient estimates of the phase shift, particularly if all decisions are correct.

It should be noted that differential components of the received signal may be used for optimal soft decision decoding as well as for mode assignment and adaptation to channel conditions as disclosed in co-owned U.S. Ser. No. 10/342,519 entitled "Methods, Apparatus, and Systems Employing Soft Decision Decoding", and U.S. Ser. No. 10/406,776 entitled "Mode Adaptation in Wireless Systems", both of which are hereby incorporated by reference herein in their entireties. In the present invention, the differential components are utilized for estimation of frequency offset and carrier phase shift.

According to an alternative embodiment of the invention, phase adjustment may be accomplished via reduction and averaging of quadrature components of the received signal. It should be appreciated that in either embodiment (i.e., phase adjustment utilizing reduction and averaging of differential quadrature components, or phase adjustment utilizing reduction and averaging of quadrature components), a demapping procedure is accomplished with linear operations and without direct calculation of the carrier phase. This is in contrast to the prior art approach which finally calculates the phase of the received carrier for the proper correction of the reference signals. See, e.g., J. Proakis, "Digital Communications", 4th edition, McGraw-Hill, 2001, Section 6.2.

According to a further aspect of the invention, based on estimates of differential quadrature components or quadrature components of the reference signal, two embodiments are provided for the demapping procedure within the phase tracking loop. A first embodiment corrects the received signal, while a second embodiment corrects the constellation points.

The first embodiment, which, in most circumstances is the desirable one from the implementation point of view, includes the proper rotation of the received signal (correction of the received coordinates) with further decision-making based on the corrected received signal without changing constellation points. The advantage of this method is that it does not need any correction of the constellation points, and, as a result, preserves the simplest decision-making procedure, based on a comparison of the received coordinates with a limited number of thresholds.

The second embodiment of implementing demapping within the phase tracking loop, is based on estimates of differential quadrature components or quadrature components of the reference signal, and includes the proper rotation of the constellation points (correction of the constellation point coordinates) with further decision-making based on the corrected constellation points. The advantage of the second mechanism is that it provides optimal adaptive processing without any changing of the received signal. In other words, the receiver does not spend processing time for transformation of each received symbol, and all processing relates only to constellation point correction. The advantage is considerable primarily for small size constellations, for example, for QPSK modulation techniques.

According to another aspect of the invention, algorithms are provided which implement a general method of phase shift estimation in single carrier and multicarrier pilotless wireless systems with uncorrelated between-carriers phase shifts. In the multicarrier case, they can provide individual phase tracking for each carrier.

According to other aspects of the invention, special simplified algorithms of frequency offset compensation and phase shift tracking for multicarrier systems with correlated between-carrier phases are provided. The simplifications are based, first, on replacing averaging in the time domain with averaging in frequency domain, and, second, on the utilization of the same phase shift estimate for all carriers. As with the general algorithms, the final demapping procedure in the simplified algorithms may use either correction of the received signal or correction of the constellation points.

According to yet another aspect of the invention, a further simplification of the pilotless multicarrier system, apparatus, and method is possible when carrier phase shifts are correlated and comparatively small. For this particular case, an extremely simplified algorithm for phase tracking is provided which is based on the estimation of only one differential component of the simplest reference vector. In one embodiment related to this aspect of the invention, the phase shift is efficiently corrected by majority-type algorithms which are based on an accumulation of differential component signs. The simplest version of the majority-type algorithms provides changing carrier phases with a constant small increment. In this case the phase adjustment algorithm determines only a direction of the adjustment which is provided by the proper majority vote procedure.

According to even another aspect of the invention, the proposed methods, systems, and apparatus for carrier phase tracking, which utilize estimates of differential quadrature components or quadrature components of the reference signal, can be further used for adaptive equalization of the received multicarrier signals. In this case, a per-carrier adaptive equalizer for multicarrier wireless systems is provided and is based on estimates of differential quadrature components of the reference vector. The equalizer combines static and dynamic equalization functions into a one-step adaptive procedure.

Additional objects and advantages of the invention will become apparent to those skilled in the art upon reference to the detailed description taken in conjunction with the provided figures.

BRIEF DESCRIPTION OF THE DRAWINGS

FIG. 5 is a flow chart illustrating correction of the received signals based on reduction and averaging of differential quadrature components of the received signals.

FIG. 6 is a flow chart illustrating correction of the constellation point coordinates based on reduction and averaging of differential quadrature components of the received signals.

FIG. 7 is a flow chart illustrating correction of the received carriers in a multicarrier system with correlated phase shift, based on differential quadrature components of the received carriers.

FIG. 8 is a flow chart illustrating correction of the constellation point coordinates in a multicarrier system with correlated phase shift, based on differential quadrature components of the received carriers.

FIG. 9 is a plot showing a constellation and various vectors useful in understanding a simplified algorithm of phase correction according to the invention.

FIG. 10 is a flow chart illustrating simplified carrier phase correction in multicarrier systems based on the differential quadrature components.

FIG. 11 is a flow chart illustrating the majority algorithm of carrier phase correction in multicarrier systems based on the differential quadrature components.

FIG. 12 is a flow chart for a per-carrier adaptive equalizer, based on estimates of differential quadrature components.

DETAILED DESCRIPTION OF THE PREFERRED EMBODIMENTS

Figure 1:
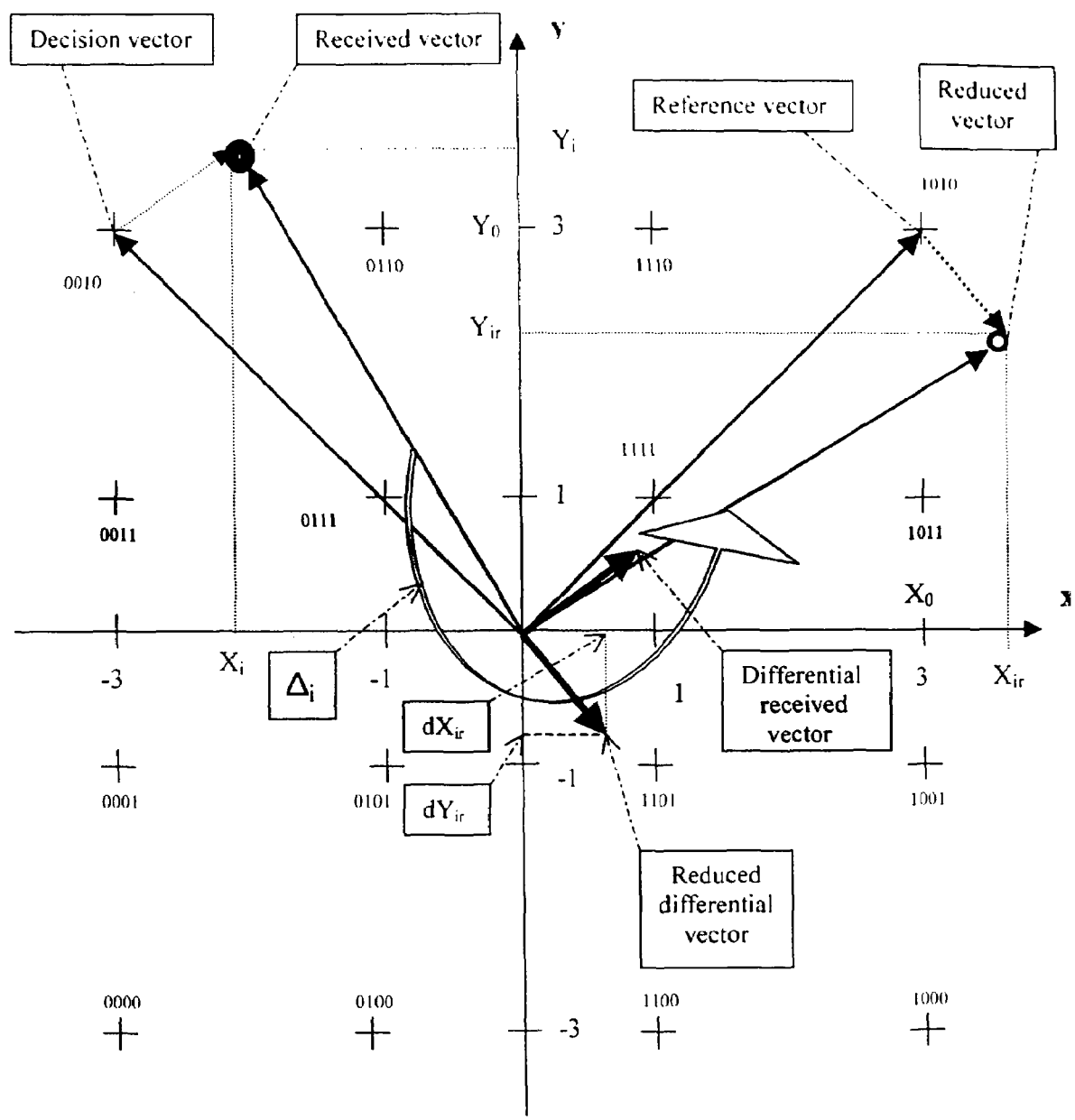
FIG. 1 is a plot showing a signal constellation and various vectors useful in understanding the invention.

According to one embodiment of the invention, an optimal (in terms of minimum variance of phase estimates) algorithm of phase adjustment in pilotless systems utilizes reduction and averaging of differential quadrature components of the received signal, where, as set forth above, a "differential quadrature component" is defined as the difference between the corresponding quadrature components of a received signal and a decision signal.

According to an alternative embodiment of the invention, phase adjustment in a pilotless system is accomplished via reduction and averaging of quadrature components of the received signal. Both embodiments provide demapping using linear operations and without direct calculation of the carrier phase. In addition, both embodiments solve two major problems of pilotless systems: the problem of fine phase adjustment, and the problem of channel estimation.

Channel estimation includes two basic procedures: channel quality estimation and channel parameters estimation. The channel quality estimation is usually based on signal-to-noise ratio (SNR) and/or on some functions of the SNR, and it is used for mode assignment, for adaptation to channel conditions, as well as for optimal soft decision decoding. The channel quality estimation algorithms and the corresponding apparatus and systems based on the calculation of differential components of the received signal are described in previously incorporated U.S. Ser. Nos. 10/342,519 and 10/406,776.

The channel parameters estimation is typically based on channel pulse response or channel frequency characteristics. In the case of multicarrier systems, for example OFDM, a set of carrier amplitudes and initial phases completely determine channel parameters necessary for frequency equalization of the received signal. As is described below, the methods of the invention for carrier phase adjustment in pilotless systems which are based on reduction and averaging of differential quadrature components of the received signal, provide simultaneously information applicable to channel parameters estimation in terms of amplitudes and phases of frequency carriers. A per-carrier equalizer for multicarrier wireless systems, based on estimates of differential quadrature components of the reference vector is provided. The equalizer combines static and dynamic equalization functions into a one-step adaptive procedure.

The methods, apparatus, and systems of the invention provide carrier phase correction for both single carrier and multicarrier wireless systems. The methods, apparatus, and systems can be divided into two classes. The first class includes general algorithms providing phase shift compensation in pilotless wireless systems with uncorrelated between-carriers phase shifts. The algorithms are applicable for both single carrier and multicarrier systems, including multicarrier systems with uncorrelated carrier phases. The second class includes special algorithms of phase shift compensation in multicarrier systems with correlated carrier phases. The Wi-Fi IEEE802.11a standard provides a typical example of a system in the second class.

Before turning to FIG. 1, it is useful to define designations which are used in the algorithms of the invention:

i—index of the current received symbol (vector) within the sequence of received symbols;

n—index of the constellation points; n=1,2, . . . m;

$X_i$, $Y_i$—coordinates (real and imaginary components) of the i'th received vector (after equalization during the preamble interval—static equalization);

$X_{ir}$, $Y_{ir}$—coordinates (real and imaginary components) of the i'th reduced vector (result of reduction of coordinates $X_i$ and $Y_i$);

$dX_i$, $dY_i$—coordinates (real and imaginary components) of the i'th received differential vector;

$dX_{ir}$, $dY_{ir}$—coordinates (real and imaginary components) of the i'th reduced differential vector;

$X_0$, $Y_0$—coordinates (real and imaginary components) of the reference vector;

$X_{cn}$, $Y_{cn}$—coordinates (real and imaginary components) of the n'th constellation points;

$\Delta_i$—phase difference between the i'th decision vector and the reference vector;

$\theta_n$—phase difference between the reference vector and the n'th constellation point;

$A_n$—amplitude of the n'th constellation point;

$a_i$—amplitude of the i'th decision vector;

$A_0$—amplitude of the reference vector;

FIG. 1 shows a 16-point constellation in 2-dimensional space (x,y), with the constellation points indicated by small crosses with corresponding binary combinations. FIG. 1 also illustrates various vectors and variables. In FIG. 1, a reference vector ("Reference vector") is shown having coordinates (3,3) and being provided with a binary combination 1010. It should be noted at the outset, that conceptually, any vector in (x,y)-space may be considered as the reference vector. In practice, however, some choices may be more convenient than others. In particular, it is convenient when the reference vector coincides with the X-axis or Y-axis, such as e.g., vector (1,0) or vector (0,1).

As seen in FIG. 1, it may be assumed that a signal with coordinates ($X_i$, $Y_i$) has been received (the "received vector"). Then a decision is made as to which constellation point is nearest the received vector. In FIG. 1, a decision is made that point 0010 with coordinates (−3,3) is the nearest constellation point relative to the received vector; and thus a "decision vector" is shown in FIG. 1. Mathematically, the decision-making procedure is described as finding a minimum distance between the received signal and various constellation points:

$$(X_{di}, Y_{di}) \Rightarrow \min_n \{(X_i - X_{cn})^2 + (Y_i - Y_{cn})^2\}; \quad (1)$$

where ($X_{di}$, $Y_{di}$) are the coordinates of the decision, ($X_{cn}$, $Y_{cn}$) are the coordinates of the n'th constellation point; n=1,2, . . . , m, and m is the number of constellation points (constellation size). According to relationship (1) above, the decision ($X_{di}$, $Y_{di}$) is a constellation point providing a minimum value to the expression on the right side.

It should be noted that each received vector contains the proper information about a probable phase shift. However, the received vector has an unknown phase and amplitude due to information content. If a correct decision regarding the transmitted vector is accomplished, the unknown phase and amplitude can be removed via rotation. The resulting vector is called the "reduced vector" as it is shown in FIG. 1. As will be discussed below, this transformation (or reduction) allows proper parameters averaging.

As can be seen from FIG. 1, the reduced vector is determined by means of simple rotation of the received vector by angle $\Delta_i$, which is equal to phase difference between the decision vector and the reference vector.

A first embodiment of the invention is based on a utilization of a "differential received vector", which is equal to a difference between the received vector and the decision vector in FIG. 1. As can be seen from FIG. 1, the differential received vector begins from the origin, i.e., the (0,0) point of the (x,y)-space, and it is determined by differential quadrature components, which are differences between the corresponding quadrature components of the received vector and the decision vector.

Calculation of the differential components of the differential received vector is a part of a decision-making procedure well known in the art (see, e.g., IEEE 802.11a, Wireless LAN Medium Access Control (MAC) and Physical Layer (PHY) specifications in the 5 GHz Band, Sections 17.3.2.1 and 17.3.5.8), and they are also calculated in well-known soft decision decoding algorithms, as well as in the new mode-adaptation methods described in the previously incorporated patent applications. In other words, the differential components are generally available as a byproduct of different computations necessary for modem functioning.

The differential quadrature components of the received signal are:

$$dX_i = (X_i - X_{di}), \quad (2a)$$

$$dY_i = (Y_i - Y_{di}), \quad (2b)$$

where ($X_{di}$, $Y_{di}$) is the i'th decision vector, which is typically equal to the constellation point nearest to the received vector ($X_i$, $Y_i$).

The reduced differential vector (see FIG. 1) is determined by means of simple rotation of the differential received vector through angle $\Delta_i$ (which in turn, as described above, is equal to phase difference between the decision vector and the reference vector).

In the general case, transformation of the differential received vector into the reduced differential vector may be described as follows:

$$dX_{ir} = (A_0/a_i)(dX_i \cos \Delta_i - dY_i \sin \Delta_i), \quad (3a)$$

$$dY_{ir} = (A_0/a_i)(dY_i \cos \Delta_i + dX_i \sin \Delta_i), \quad (3b)$$

where $dX_{ir}$ and $dY_{ir}$ are reduced differential components of the i'th received vector. Similarly, the quadrature components of the received signal $X_i$ and $Y_i$ may be directly reduced to the corresponding components of the reference vector:

$$X_{ir} = (A_0/a_i)(X_i \cos \Delta_i - Y_i \sin \Delta_i), \quad (3c)$$

$$Y_{ir} = (A_0/a_i)(Y_i \cos \Delta_i + X_i \sin \Delta_i). \quad (3d)$$

Thus, the reduction procedure can be described by equations 3(a)-3(d) or by a corresponding table. For example, a QPSK system may have the constellation vectors $X_{c1}=-1$, $Y_{c1}=-1$; $X_{c2}=-1$, $Y_{c2}=1$; $X_{c3}=1$, $Y_{c3}=-1$; $X_{c4}=1$, $Y_{c4}=1$, which are typical for many wireless applications. For this example, one of the constellation vectors should be assigned as the reference vector, because in this case, the phase difference $\Delta_i$ between the decision vector and the reference vector is a multiple of $\pi/2$. If, for example, the reference vector is $X_0=1$, $Y_0=1$, the reduction procedure may be described by Table 1:

TABLE 1

| Decision Vector | $\Delta_1$ | $dX_{ir}$ | $dY_{ir}$ | $X_{ir}$ | $Y_{ir}$ |
|---|---|---|---|---|---|
| (−1, 1) | $3\pi/2$ | $dY_i$ | $-dX_i$ | $Y_i$ | $-X_i$ |
| (−1, −1) | $\pi$ | $-dX_i$ | $-dY_i$ | $-X_i$ | $-Y_i$ |
| (1, −1) | $\pi/2$ | $-dY_i$ | $dX_i$ | $-Y_i$ | $X_i$ |
| (1, 1) | 0 | $dX_i$ | $dY_i$ | $X_i$ | $Y_i$ |

As one can see, the reduction procedure in this particular case does not need any calculations. In a similar manner, more complicated tables for reduction of the received signals in multiposition QAM systems may be generated.

It should be appreciated by those skilled in the art, that the reduced coordinates of equations (3a)-(3d) may be meaningfully averaged (in contrast to coordinates $dX_i$ and $dY_i$ which would typically average to zero). According to the invention, the reduced coordinates are averaged for a given sequence of N symbols, defined by indexes from (i-N) to i, as follows:

$$dX_r(i) = (1/N)\sum dX_{jr} \quad (4a)$$
$$= (A_0/N) * \sum_{j=i-N}^{i} (dX_j\cos\Delta_j - dY_j\sin\Delta_j)/a_j,$$

$$dY_r(i) = (1/N)\sum dY_{jr} \quad (4b)$$
$$= (A_0/N) * \sum_{j=i-N}^{i} (dY_j\cos\Delta_j + dX_j\sin\Delta_j)/a_j,$$

where $dX_r(i)$ and $dY_r(i)$ are averaged differential components at the i'th received symbol. Values $dX_r(i)$ and $dY_r(i)$ from equations (4a) and (4b) are the current estimates of coordinates of differences between the reference vector and the shifted reference vector in the (x,y) space. They are the basis for carrier phase tracking.

Similarly, the reduced quadrature components of the received signal $X_{ir}$ and $Y_{ir}$ from equations (3c) and (3d) may be averaged:

$$X_r(i) = (1/N)\sum X_{jr} \quad (4c)$$
$$= (A_0/N) * \sum_{j=i-N}^{i} (X_j\cos\Delta_j - Y_j\sin\Delta_j)/a_j,$$

$$Y_r(i) = (1/N)\sum Y_{jr} \quad (4d)$$
$$= (A_0/N) * \sum_{j=i-N}^{i} (Y_j\cos\Delta_j + X_j\sin\Delta_j)/a_j,$$

Values $X_r(i)$ and $Y_r(i)$ from equations (4c) and (4d) are the current estimates of coordinates of the shifted reference vector in the (x,y) space. They can be also used as the basis for carrier phase tracking.

It should be appreciated by those skilled in the art that the averaging of equations (4a)-(4d) can be implemented in different manners. One manner of implementation is the conventional averaging with a sliding window. In this case, the estimates $dX_r(i)$ and $dY_r(i)$, as well as $X_r(i)$ and $Y_r(i)$, are calculated for each symbol by averaging the N preceding symbols. This approach guarantees the most accurate phase correction, but it requires considerable processing resource and memory. This level of phase correction may not always be deemed necessary in typical wireless systems with slow phase changes.

A second manner of implementing equations (4a)-(4d) is to average blocks of N symbols. In this case the estimates $dX_r$ and $dY_r$, as well as $X_r$ and $Y_r$, are calculated for each block of N symbols (block by block), and phase correction is provided once per N-symbol block. This approach needs very little memory and requires minimal processing.

It should be also noted that if all decisions participating in any of the averaging procedures of equations (4a)-(4d) are correct, then the generated estimate is an optimal one, i.e., it is unbiased and effective in terms of the minimum variance. In other words, averaging reduced signal components and averaging reduced differences between the received signals and decisions provide equivalent nonbiased and efficient estimates of the phase shift.

Figure 2:
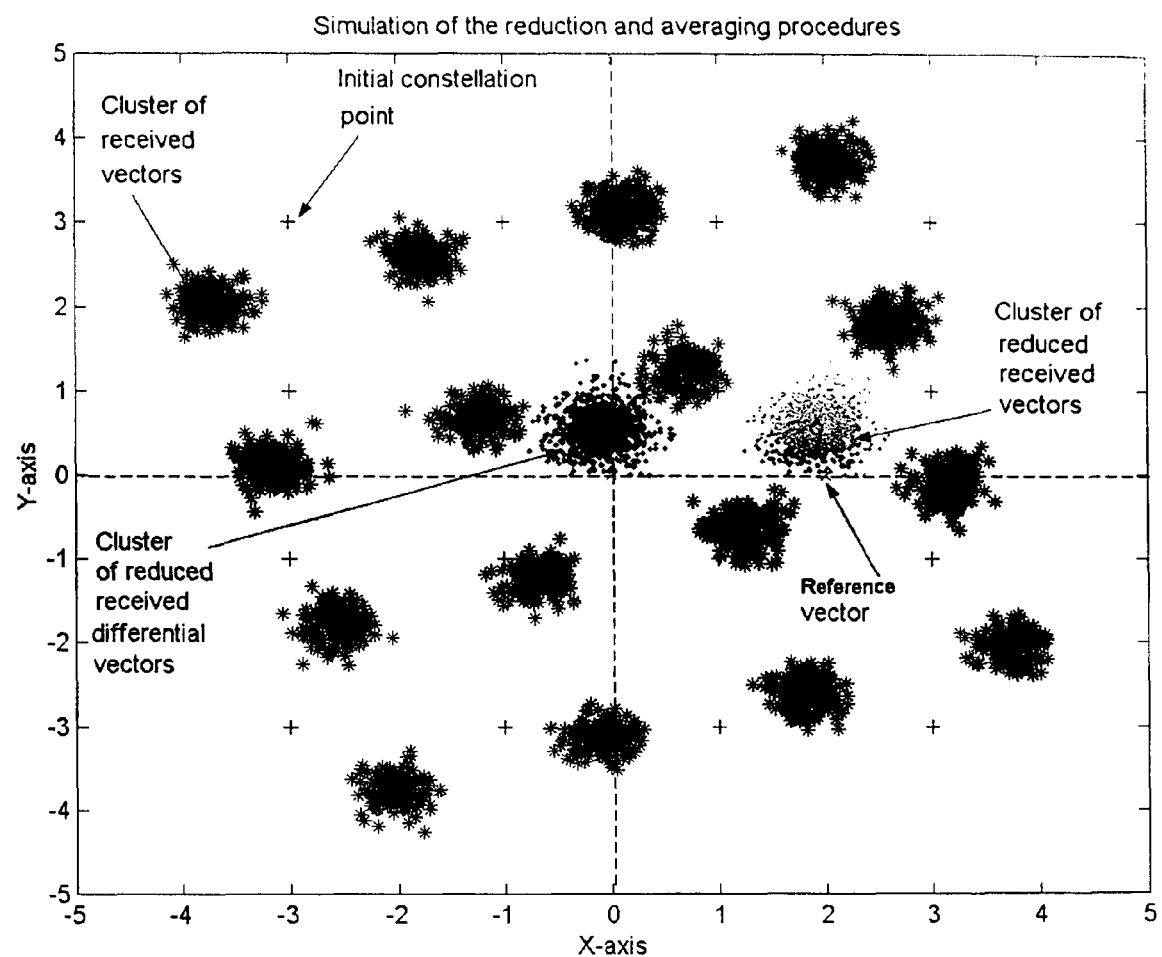
FIG. 2 is a two-dimensional plot showing results of stochastic simulation of random signal reduction and averaging for 16-QAM constellation points, phase shifted by $\pi/11$, in the AWGN channel.

This statement is illustrated in FIG. 2, which shows results of a simulation of equations (3) and (4). The constellation points are indicated by small crosses and the reference vector in this example has coordinates (2,0). Randomly transmitted constellation points are phase shifted by $\pi/11$ and the Gaussian noise is added. Received signals are indicated by stars and combined into clusters of received vectors. Then all received vectors and differential vectors are reduced (via rotation) and transformed into a cluster of reduced received vectors and into a cluster of reduced received differential vectors. Both transformations were carried out for an error-free decision. It will be appreciated that the two resulting clusters are congruent and may be one-to-one converted from one to another by shifting their X-coordinates by 2. Results of the averaging of these clusters are indicated by circles with points at their centers; naturally, they differ exactly by 2 in the X-coordinate.

Figure 3:
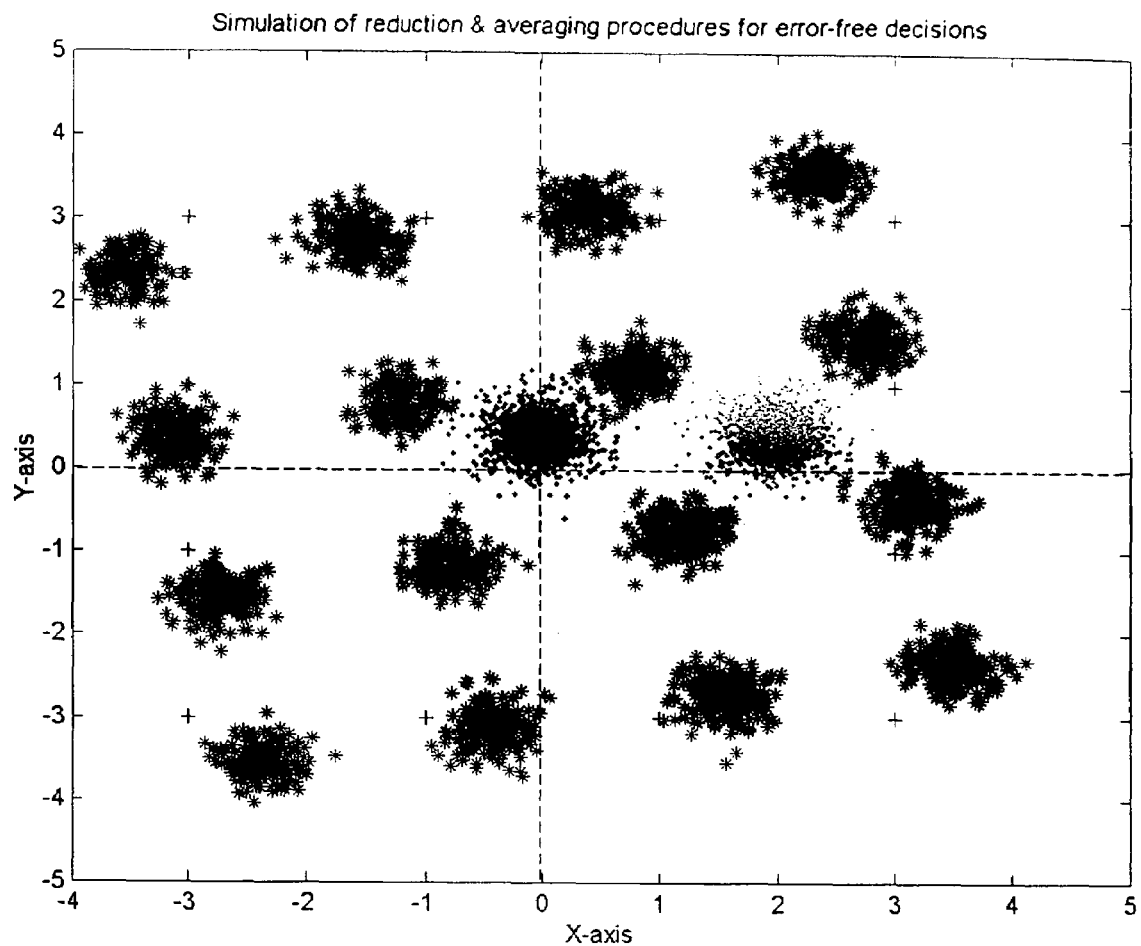
FIG. 3 is a two-dimensional plot showing results of stochastic simulation of random signal reduction and averaging for 16-QAM constellation points, phase shifted by $\pi/16$, in the AWGN channel, when all decisions are correct ones.
Figure 4:
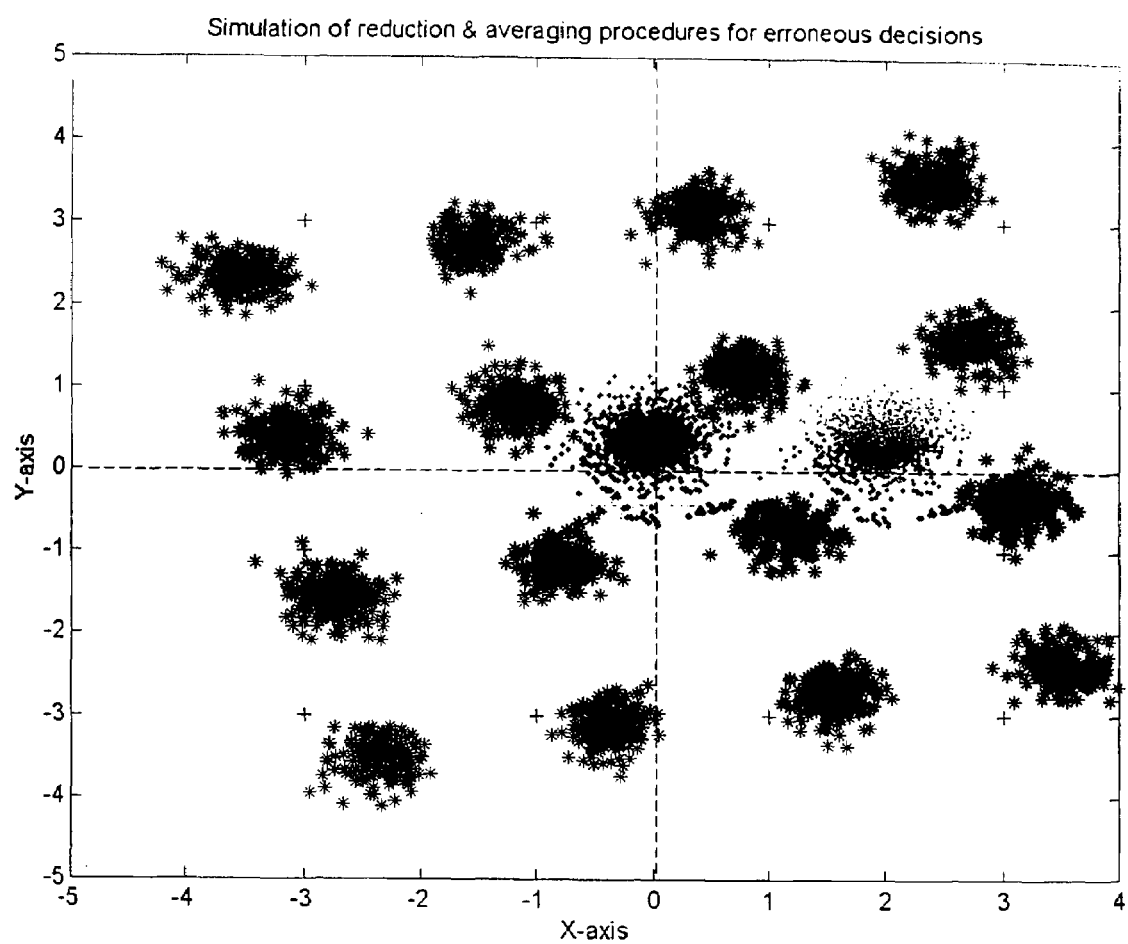
FIG. 4 is a two-dimensional plot showing results of stochastic simulation of random signal reduction and averaging for the same conditions as in FIG. 3, when the decisions have errors with symbol error rate 0.01.

As previously mentioned, erroneous decisions cause bias in the estimate, and for a large error rate this bias may be considerable. FIG. 3 and FIG. 4 qualitatively illustrate this effect.

FIG. 3 and FIG. 4 show simulation results for equations (3) and (4) at a phase shift $\pi/16$ and a SNR corresponding to (the relatively large) symbol error rate SER=0.01. FIG. 3, however, corresponds to error-free decisions, while FIG. 4 corresponds to the decisions which include errors with the above SER. By comparing FIGS. 3 and 4, it is seen that clusters of reduced signals which include erroneous decisions are more dispersed than the clusters of reduced signals which involve error-free decisions.

The algorithms of equations (3) and (4) have been simulated and computer tested to estimate their efficiency for error-free and erroneous decisions. In addition, the method of the invention of phase estimation based on averaging coordinates of the reduced differential received signal, was compared with the existing prior art method which is based on averaging phase shift of the received signals. In the test, the simulation program shifted by $\pi/20$ the phases of transmitted 16-QAM random signals. Both compared methods were simulated in parallel with a 100-symbol averaging interval and with different SNRs, corresponding to symbol error rates (SER) 0.01, 0.05 and 0.1.

The result of the test can be briefly described as follows. For error-free decisions both methods provide unbiased estimates of the phase shift, and dispersion of the phase estimates increases with increasing SER. For the 100-symbol averaging interval, the mean deviation lies within the limits of 0.6°-1.2°, depending on the SER. However, the method of the invention provides less dispersion of phase estimates. In particular, the method of the invention gains 2% in the phase estimate dispersion at SER=0.01, 5% at SER=0.05, and 10% at SER=0.1.

For decisions that include errors, both methods provide approximately the same bias in the phase estimates, and the bias increases with increasing SER. For the considered conditions and phase shift $\pi/20=9°$, real phase shift estimates were equal to 8.5° at SER=0.01 (−0.50 bias or 6%), 7.5° at SER=0.05 (−1.5° bias or 17%), and 5.5° at SER=0.1 (−3.5° bias or 39%). In addition, dispersion of the phase estimates increases with increasing SER. For the 100-symbol averaging interval, the mean deviation lies within the same limits 0.6°-1.2°, depending on SER. The method of the invention provides the minimum dispersion of phase estimates. Compared with the prior art method, the method of the invention gains 1.5% in the phase estimate dispersion at SER=0.01, 2.5% at SER=0.05, and 3.5% at SER=0.1.

It is clear from the simulation that at severe channel conditions (SER>0.01), it is desirable to correct estimates. A simple method of estimate correction is to exclude extreme points in the cluster of reduced signals; and these extreme points can be easily identified because, as one can see from comparing FIG. 3 and FIG. 4, utilization of erroneous decision moves the points to the edge of the cluster. Unfortunately, exclusion of those extreme points can be implemented only after completion of the cluster calculation; i.e., it delays final estimation.

According to one aspect of the invention, two practical approaches to solving this matter include correction of the final estimate, and exclusion of unreliable points. First, with respect to correction of the final estimate, as it was shown in the stochastic simulation, the estimate bias is a function of three parameters: SER, constellation size, and the mean of the estimate. All three parameters, as a rule, are known during the estimation procedure. For example, for 16-QAM encoding, a phase shift estimate should be increased by 6% at SER=0.01, 17% at SER=0.05, and 39% at SER=0.1. The required function can be determined in advance by means of stochastic simulation of the system for different expected conditions. Unfortunately, the method guarantees good results only for comparatively small phase shifts.

Exclusion of unreliable points is a more general approach, and it does not need preliminary simulation. The essence of this method is the exclusion of unreliable symbols from the averaging process. As will be appreciated by those skilled in the art, calculation of the reliability of the received symbols is one of functions of soft decision decoder. The corresponding procedure, based on differential components of the received signal, was disclosed in the previously incorporated patent applications. The estimates of symbol reliability can be used for exclusion of symbols, which likely cause the phase estimate bias. In practice, the procedure for excluding unreliable points would include comparing the symbol reliability calculated in the soft decoder with some predetermined threshold.

In any case, estimates such as set forth above in equations (4) with the proper correction can be used for current decision-making. According to different embodiments of the invention, these estimates can be utilized to correct the received signal, or can be utilized to correct the constellation points.

Correction of the received signal according to a first embodiment of the invention is typically preferable from an implementation point of view. Correction of the received signal involves the proper rotation of the received signal (correction of the received coordinates) with further decision making, based on the corrected received signal without changing constellation points.

In particular, let $X_{ic}$ and $Y_{ic}$ be corrected coordinates of the received signal $(X_i, Y_i)$. The coordinates may be calculated as follows:

$$X_{ic}=(X_i \cos \phi - Y_i \sin \phi), \quad (5a)$$

$$Y_{ic}=(Y_i \cos \phi + X_i \sin \phi), \quad (5b)$$

where $\phi$ is a carrier phase shift, which in turn is equal to a current estimate of a phase difference between the initial reference vector and corrected (estimated) reference vector.

Taking into account that the corrected reference vector has coordinates $X_0+dX_r$ and $Y_0+dY_r$, where $dX_r$ and $dY_r$ are averaged differential components according to (4), the trigonometric functions of phase $\phi$ are derived as follows:

$$A \sin \phi = (X_0+dX_r)Y_0 - (Y_0+dY_r)X_0 = dX_rY_0 - dY_rX_0, \quad (6a)$$

$$A \cos \phi = (X_0+dX_r)X_0 + (Y_0+dY_r)Y_0 = (A_0)^2 + dX_rX_0 + dY_rY_0, \quad (6b)$$

where $$A = A_0((X_0+dX_r)^2 + (Y_0+dY_r)^2)^{0.5}. \quad (6c)$$

Thus, for example, if the reference signal has coordinates $X_0=1$ and $Y_0=0$, then $A \sin \phi = -dY_r$ and $A \cos \phi = 1+dX_r$.

By substituting equations (6) into (5), the following expressions are obtained for corrected coordinates of the received signal:

$$X_{ic}=(1/A)\{((A_0)^2+dX_rX_0+dY_rY_0)X_i - (dX_rY_0-dY_rX_0)Y_i\}, \quad (7a)$$

$$Y_{ic}=(1/A)\{((A_0)^2+dX_rX_0+dY_rY_0)Y_i + (dX_rY_0-dY_rX_0)X_i\}, \quad (7b)$$

where $dX_r$ and $dX_r$ are the estimates (4) of differential components of the reference signal.

In the same manner, corrected coordinates of the received signal $X_{ic}$ and $Y_{ic}$ can be derived using estimates of coordinates (4c, d) of the shifted reference vector as follows:

$$X_{ic}=(1/A)(X_i(X_rX_0+Y_rY_0) - Y_i(X_rY_0-Y_rX_0)), \quad (7c)$$

$$Y_{ic}=(1/A)(Y_i(X_rX_0+Y_rY_0) + X_i(X_rY_0-Y_rX_0)), \quad (7d)$$

where $A = A_0((X_r)^2 + (Y_r)^2)^{0.5}$.

Equations (7a)-(7d) can be simplified by the proper choice of the reference signals. If, for example, the reference signal has coordinates $X_0=1$ and $Y_0=0$, and account is taken that in this case $A \approx 1$, the following simple expressions are derived from equations (7a) and (7b):

$$X_{ic}=X_i+(dX_rX_i+dY_rY_i), \quad (8a)$$

$$Y_{ic}=Y_i+(dX_rY_i-dY_rX_i). \quad (8b)$$

In this case, correction of the received signal comprises adding of the convolutions in the parentheses to the received components $X_i$ and $Y_i$; and thus, in practice, implementation of equations (8a) and (8b) is preferable.

For the same conditions equations (7c) and (7d) are transformed as follows:

$$X_{ic}=X_iX_r+Y_iY_r, \quad (8c)$$

$$Y_{ic}=Y_iX_r-X_iY_r. \quad (8d)$$

Given all of the above, according to the first embodiment of the invention, the method for correcting the received signal is as follows (the method being described in parallel for both the preferred first embodiment utilizing differential quadrature components and the alternative first embodiment utilizing the quadrature components of the received signal):

a) the received signal ($X_i$, $Y_i$) is corrected with estimates of the differential reference vector ($dX_r$, $dY_r$) or with estimates of reference vector ($X_r$, $Y_r$) according to equations (7) or (8);

b) the corrected received signal ($X_{ic}$, $Y_{ic}$) is used for making a decision and for calculating the differential quadrature components of the corrected received signal $dX_i$ and $dY_i$;

c) using the decision, the differential components $dX_i$ and $dY_i$ or corrected components $X_{ic}$ and $Y_{ic}$ are transformed into the reduced differential components $dX_{ir}$ and $dX_{ir}$ or reduced components $X_{ir}$ and $X_{ir}$ according to equations (3);

d) sequences of reduced differential components $dX_{ir}$ and $dY_{ir}$ or reduced components $X_{ir}$ and $X_{ir}$ are averaged according to equations (4) to provide a current estimate of the differential reference vector ($dX_r$, $dY_r$) or the reference vector ($X_r$, $Y_r$); and e) upgraded coordinates of the differential reference vector $dX_r$ and $dY_r$ or the reference vector $X_r$ and $Y_r$ are used for the next correction of the received signal according to equations (7) or (8).

Turning now to FIG. 5, a flow chart of the first embodiment is provided that illustrates the five-step procedure of signal demapping and received signal correction based on estimates of differential components of the reference signal. In the flow chart, certain blocks are shown with a bold outline while other blocks are shown with a thin outline. The blocks shown in the thin outline (e.g., the current decision unit 104, differences calculation unit 108, hard decoder 106, soft decoder 112 and channel estimation unit 110) are blocks which are conventional parts of a receiver and are a universal tool of optimal signal processing, including channel estimation and soft decoding, whereas the blocks shown in bold are added for implementing the invention.

According to the first embodiment of the invention, and as seen in FIG. 5, the received signal is first corrected at 102 using the current estimates of differential reference vector. Then the corrected received signal is utilized for making a decision at 104 (see equation (1)), and the decision is fed to the hard decoder 106 and to the differences calculation unit 108. The differences (see equation (2)) are provided for channel estimation at 110 and the soft decoder 112. The current decision 104 determines parameters of signal reduction $\Delta_i$, $A_0$, $a_i$ or one or more indications thereof such as $A_0/a_i$ which are stored in the parameters memory 114. Based on these parameters, the differential components of the received signals as determined by the differences calculation unit 108 are reduced at 116 (according to equations (3)) and then averaged at 118 (according to equations (4)). Exclusion of unreliable symbols (if applied) is carried out at 120 and is used to eliminate unreliable symbols from the differential signal reduction block prior to their use in the signal averaging block 118. The symbol exclusion block 120 utilizes information regarding symbol reliability from the soft decoder 112. Finally, the estimates of coordinates of the differential reference vector as determined by the signal averaging block 118 are fed to the received signal correction block 102.

It should be noted that the system and method implemented in FIG. 5 does not use any nonlinear calculation of the carrier phase, and all calculation procedures in the loop of FIG. 5 include only linear operations, based on carrier projections. An advantage of the system and method of FIG. 5 is that it does not need any correction of the constellation points, and, as a result, preserves the simplest decision making procedure, based on comparison of the received coordinates with a limited number of thresholds.

A second embodiment of utilization of phase shift estimates is the proper rotation of the constellation points (correction of the constellation point coordinates) with further decision making, based on the corrected constellation points.

More particularly, let $X_{cn}(i)$ and $Y_{cn}(i)$ be current corrected coordinates of the constellation points, where n=1,2, . . . , m, and where m represents the number of the constellation points. With $X_0$ and $Y_0$ being coordinates of the current reference point, the corrected coordinates may be calculated as follows:

$$X_{cn}(i)=(A_n/A_0)\{(X_0+dX_r(i))\cos\theta_n-(Y_0+dY_r(i))\sin\theta_n\}, \quad (9a)$$

$$Y_{cn}(i)=(A_n/A_0)\{(Y_0+dY_r(i))\cos\theta_n+(X_0+dX_r(i))\sin\theta_n\}, \quad (9b).$$

where $\theta_n$ is the phase difference between the reference vector and the n'th constellation point.

Equations (9) describe one step of correction of the constellation points coordinates. During the adaptation process, ($X_0 \cos\theta_n - Y_0 \sin\theta_n$) and ($Y_0 \cos\theta_n + X_0 \sin\theta_n$) can be considered as estimates of constellation points at the previous step; i.e., $$X_{cn}(i-1)=(A_n/A_0)(X_0\cos\theta_n-Y_0\sin\theta_n), \quad (10\text{ a})$$

$$Y_{cn}(i-1)=(A_n/A_0)(Y_0\cos\theta_n+X_0\sin\theta_n). \quad (10\text{ b})$$

Combining equations (9) and (10) yields:

$$X_{cn}(i)=X_{cn}(i-1)+(A_n/A_0)(dX_r(i)\cos\theta_n-dY_r(i)\sin\theta_n), \quad (11a)$$

$$Y_{cn}(i)=Y_{cn}(i-1)+(A_n/A_0)(dY_r(i)\cos\theta_n+dX_r(i)\sin\theta_n). \quad (11b)$$

Similarly, corrected coordinates of the constellation points $X_{cn}$ and $Y_{cn}$ can be derived using coordinates from equations (4c) and (4d) of the shifted reference vector as follows:

$$X_{cn}(i)=(A_n/A_0)(X_r(i)\cos\theta_n-Y_r(i)\sin\theta_n), \quad (11c)$$

$$Y_{cn}(i)=(A_n/A_0)(Y_r(i)\cos\theta_n+X_r(i)\sin\theta_n). \quad (11d)$$

Equations (11a)-(11d) can be significantly simplified for BPSK and QPSK systems. If, for example, in a QPSK system with constellation vectors $X_{c1}$,=-1, $Y_{c1}$=-1; $X_{c2}$, =-1, $Y_{c2}$=1; $X_{c3}$, =1, $Y_{c3}$=-1; $X_{c4}$,=1, $Y_{c4}$=1, the reference vector is $X_0$=1, $Y_0$=1, then equations (11a) and (11b) have the following simple expressions:

for n=1,2,3

$$X_{cn}(i)=X_{cn}(i-1)\pm dY_r(i), \quad (12a)$$

$$Y_{cn}(i)=Y_{cn}(i-1)\pm dX_r(i); \quad (12b)$$

for n=4

$$X_{cn}(i)=X_{cn}(i-1)+dX_r(i), \quad (12c)$$

$$Y_{cn}(i)=Y_{cn}(i-1)+dY_r(i). \quad (12d)$$

Given all of the above, according to a second embodiment of the invention, the method for the correction of constellation points is as follows (the algorithm is described in parallel for both the second embodiment utilizing differential quadrature components and an alternative second embodiment utilizing quadrature components of the received signal):

a) the received signal $(X_i, Y_i)$ is used for making decision, and differential quadrature components of the received signal $dX_i$ and $dY_i$ are calculated according to equations (2);

b) using the decision, the differential components $dX_i$ and $dY_i$ or components $X_i$ and $Y_i$ are transformed into the reduced differential components $dX_{ir}$ and $dX_{ir}$ according to equations (3a) and (3b) or into reduced components $X_{ir}$ and $X_{ir}$ according to equations (3c) and (3d);

c) sequences of reduced differential components $dX_{ir}$ and $dX_{ir}$ or reduced components $X_{ir}$ and $X_{ir}$ are averaged to provide current estimates of the differential reference vector $(dX_r, dY_r)$ according to equations (4a) and (4b) or the reference vector $(X_r, Y_r)$ according to equations (4c) and (4d);

d) based on estimates $dX_r$ and $dY_r$ or estimates $X_r$ and $Y_r$, corrected coordinates of the constellation points $X_{cn}$ and $Y_{cn}$ are calculated according to equations (11); and e) upgraded coordinates of the constellation points $X_{cn}$ and $Y_{cn}$ are used for making the next decision.

Turning now to FIG. 6, a flow chart is provided that illustrates the above five-step procedure of signal demapping and the constellation points correction according to the second embodiment of the invention, based on estimates of the differential reference components. In the block-diagram, certain blocks are shown in bold lines and certain blocks are shown in thin lines. The blocks shown in the thin outline (e.g., the current decision unit 204, differences calculation unit 208, hard decoder 206, soft decoder 212 and channel estimation unit 210) are blocks which are conventional parts of a receiver and are a universal tool of optimal signal processing, including channel estimation and soft decoding, whereas the blocks shown in bold are added for implementing the invention.

As seen in FIG. 6, the received signal, first, is used for making a current decision at 204, and the decision is fed to the hard decoder 206 and to the differences calculation unit 208. The differences calculations are used by channel estimation 210 and soft decoder 212. The current decision is also used to determine parameters of signal reduction such as $\Delta_i$, $A_0$, $a_i$, or indications thereof such as $A_0/a_i$, which are stored in the parameters memory 214. Based on these parameters, the differential components of the received signals are reduced at 216 and then averaged at 218. As was described above with reference to FIG. 5, using information provided by the soft decoder 212, exclusion of unreliable symbols (if applied) is carried out at 220 so that only reliable symbols are provided to the signal averaging block 218. Finally, corrected constellation points are calculated at 225, and the upgraded constellation coordinates are fed to the current decision block 204.

The advantage of the system of FIG. 6 is that it provides optimal adaptive processing without any changing of the received signal. In other words, in the second embodiment of the invention, the receiver does not spend processing time for transformation of each received symbol, and all processing relates only to constellation point correction. The constellation point correction need not be carried out as frequently as the symbol rate; e.g., it can be carried out one time per 100 symbols. The advantage of the system of FIG. 6 may therefore be considerable for small size constellations; for example, for BPSK or QPSK modulation techniques. However, in the case of large size constellations (16-QAM, 64-QAM and so on) the system in FIG. 6 has the disadvantage of requiring a relatively complicated decision making procedure, which includes comparison of the received signal with all upgraded constellation points and recalculation of large number of constellation points. Thus, for the multiposition QAM modulation, the embodiment of FIG. 5 which utilizes correction of the received signal is presently the more preferred method.

The previously disclosed embodiments provide a general method of phase shift compensation in single carrier and multicarrier pilotless wireless systems with uncorrelated between-carriers phase shifts. In the multicarrier case, the algorithms of the embodiments can provide individual phase tracking for each carrier. However, the algorithms may be simplified for multicarrier wireless system with correlated carriers.

Completely correlated carriers are found in wireless systems with small carrier diversity and/or with short communication sessions (short packet transmission). Such conditions allow the phase adjustment algorithms to be simplified. According to one aspect of the invention, the simplification may be based on substituting averaging in the time domain by averaging in the frequency domain. According to another aspect of the invention, the simplification may be based on utilization of the same phase shift estimate for all carriers.

The equations applicable to the multicarrier systems and methods with correlated carriers use the same variables as do the previously described embodiments. In order to distinguish the averaging in time and frequency domains, the index "k", which are carrier numbers, will be used instead of the index "i", which were symbol numbers in time domain.

With that change in designation, the differential components $dX_k$ and $dY_k$ of the k-th carrier, equivalent to differential components in equations (2), are $$dX_k = (X_k - X_{dk}), \quad (13a)$$

$$dY_k = (Y_k - Y_{dk}), \quad (13b)$$

where $X_k$ and $Y_k$ are the quadrature components of the k-th carrier, and $X_{dk}$, $Y_{dk}$ are the quadrature components of the k-th carrier decision that typically correspond to the constellation point nearest to the received vector $(X_k, Y_k)$.

The reduced differential components $dX_{kr}$ and $dY_{kr}$ of the k-th carrier are $$dX_{kr} = (A_0/a_k)(dX_k \cos \Delta_k - dY_k \sin \Delta_k), \quad (14a)$$

$$dY_{kr} = (A_0/a_k)(dY_k \cos \Delta_k + dX_k \sin \Delta_k), \quad (14b)$$

where $\Delta_k$ is the phase difference between the decision and reference vectors at the k-th carrier, $a_k$ is the amplitude of the decision vector at the k-th carrier, and $A_0$ is the amplitude of the reference vector.

In the same manner that the differential quadrature components are reduced in equations (14a) and (14b), the quadrature components of the received carriers $X_k$ and $Y_k$ may be directly reduced to the corresponding components $X_{kr}$ and $Y_{kr}$ of the reference vector:

$$X_{kr} = (A_0/a_k)(X_k \cos \Delta_k - Y_k \sin \Delta_k), \quad (14c)$$

$$Y_{kr} = (A_0/a_k)(Y_k \cos \Delta_k + X_k \sin \Delta_k). \quad (14d)$$

From equations (14a) and (14b), it will be appreciated that the averaged reduced differential components $dX_r$ and $dY_r$ are $$dX_r = (1/K)\sum dX_{kr} \qquad (15a)$$
$$= (A_0/K) * \sum_{k=1}^{K} (dX_k \cos\Delta_k - dY_k \sin\Delta_k)/a_k,$$

$$dY_r = (1/K)\sum dY_{kr} \qquad (15b)$$
$$= (A_0/K) * \sum_{k=1}^{K} (dY_k \cos\Delta_k + dX_k \sin\Delta_k)/a_k,$$

where K is the number of carriers. Similarly, the reduced quadrature components of the received carriers $X_{kr}$ and $Y_{kr}$ as set forth in equations (14c) and (14d) may be averaged:

$$X_r = (1/K)\sum X_{kr} \qquad (15c)$$
$$= (A_0/K) * \sum_{k=1}^{K} (X_k \cos\Delta_k - Y_k \sin\Delta_k)/a_k,$$

$$Y_r = (1/K)\sum Y_{kr} \qquad (15d)$$
$$= (A_0/K) * \sum_{k=1}^{K} (Y_k \cos\Delta_k + X_k \sin\Delta_k)/a_k.$$

The estimates of the corrected differential reference signal (equations (15a) and (15b)) or the corrected reference signal (equations (15c) and (15d)) may be utilized for correction of a common carrier phase shift in the same manner as described above with reference to estimate equations (4a)-(4d). However, it should be noted that, in contrast to estimates of equations (4) which provide an individual estimate for each carrier, the estimates provided by equations (15) are the same for all carriers. Therefore, estimate (15) can be used for correction of all received carriers or for correction of constellation points for all carriers.

In correcting the received carriers, the procedure is generally equivalent to equations (7), and can be described as follows for differential quadrature components of carriers:

$$X_{kc} = (1/A)\{((A_0)^2 + dX_r X_0 + dY_r Y_0) X_k - (dX_r Y_0 - dY_r X_0) Y_k\}, \qquad (16a)$$

$$Y_{kc} = (1/A)\{((A_0)^2 + dX_r X_0 + dY_r Y_0) Y_k + (dX_r Y_0 - dY_r X_0) X_k\}, \qquad (16b)$$

and as follows for quadrature components of carriers:

$$X_{kc} = (1/A)(X_k(X_r X_0 + Y_r Y_0) - Y_k(X_r Y_0 - Y_r X_0)), \qquad (16c)$$

$$Y_{kc} = (1/A)(Y_k(X_r X_0 + Y_r Y_0) + X_k(X_r Y_0 - Y_r X_0)), \qquad (16d)$$

where $X_{kc}$, $Y_{kc}$ are the corrected quadrature components of the k-th carrier, $X_k$, $Y_k$ are the received quadrature components of the k-th carrier, $dX_r$ and $dY_r$ are the estimates of differential components of the reference signal calculated according to equations (15a) and (15b), and $X_r$ and $Y_r$ are the estimate of components of the reference signal calculated according to equations (15c) and (15d). Those skilled in the art will appreciate that the expressions in equations (16a)-(16d) are the same for all carriers.

Given the above, the method of carrier correction in multicarrier systems having correlated phase shifts may be described as follows:

a) a set of received carriers ($X_k$, $Y_k$) is transformed into a set of corrected carriers ($X_{kc}$, $Y_{kc}$) using common estimates of differential quadrature components of the reference signal $dX_r$ and $dY_r$ according to equations (16a) and (16b) or quadrature components of the reference signal $X_r$ and $Y_r$ using equations (16c) and (16d) for all carriers;

b) the set of corrected carriers ($X_{kc}$, $Y_{kc}$) is used for making multicarrier current decisions, and differential quadrature components of the carriers $dX_k$ and $dY_k$ are calculated according to equations (13);

c) using the decisions, the set of differential components $dX_k$ and $dY_k$ or the set of components $X_k$ and $Y_k$ are transformed into a set of reduced differential components $dX_{kr}$ and $dX_{kr}$ according to equations (14a) and (14b) or into a set of reduced components $X_{kr}$ and $X_{kr}$ according to equations (14c) and (14d);

d) the set of reduced differential components $dX_{kr}$ and $dY_{kr}$ are averaged according to equations (15a) and (15b), or the set of reduced components $X_{kr}$ and $Y_{kr}$ are averaged according to equations (15c) and (15d) to provide the current estimate of the differential reference vector ($dX_r$, $dY_r$) or reference vector ($X_r$, $Y_r$); and e) upgraded coordinates of the differential reference vector $dX_r$ and $dY_r$ or the reference vector $X_r$ and $Y_r$, common for all carriers, are used for correction of the next multicarrier symbol according to equations (16).

Turning now to FIG. 7, a flow chart is provided which illustrates the above-described five step procedure of signal demapping and received carriers correction for multicarrier systems with correlated carrier phase shifts, based on differential quadrature components of the carriers. As with FIG. 5, certain blocks are shown with a bold outline while other blocks are shown with a thin outline; with the blocks shown in the thin outline indicating conventional parts of a receiver. Blocks 302-318 of FIG. 7 are similar to blocks 102-118 of FIG. 5 (with numbering differing by 200). The difference between the elements of FIG. 5 and FIG. 7 can be explained as follows: the system of FIG. 5 which utilizes equations (3), (4), (7) and (8) provides an individual phase shift estimate for each carrier on the basis of averaging each carrier's signals in the time domain, whereas the system of FIG. 7 which utilizes equations (13)-(16) provides a common phase shift estimate for all carriers on the basis of averaging carrier signals in the frequency domain.

It should be appreciated by those skilled in the art that the second embodiment of the invention which is directed to correcting constellation point coordinates can be used in conjunction with the discussion above regarding multicarrier systems having correlated phase shifts. In particular, in the case of constellation points correction the procedure is equivalent to equations (11), and can be described as follows for differential components $dX_r$, $dY_r$ of the reference vector:

$$X_{cn} = X_n + (A_n/A_0)(dX_r \cos\theta_n - dY_r \sin\theta_n); \qquad (17a)$$

$$Y_{cn} = Y_n + (A_n/A_0)(dY_r \cos\theta_n + dX_r \sin\theta_n); \qquad (17b)$$

and as follows for components $X_r$, $Y_r$ of the reference vector:

$$X_{cn} = (A_n/A_0)(X_r \cos\theta_n - Y_r \sin\theta_n), \qquad (17c)$$

$$Y_{cn} = (A_n/A_0)(Y_r \cos\theta_n + X_r \sin\theta_n), \qquad (17d)$$

where ($X_{cn}$, $Y_{cn}$) is the corrected n-th constellation point, and ($X_n$, $Y_n$) is the initial n-th constellation point. Again, it should be emphasized that the corrected constellation point ($X_{cn}$, $Y_{cn}$) in equations (17) is the same for all carriers.

Given the above, the complete algorithm of constellation point correction in multicarrier systems may be described as follows:

a) a set of received carriers ($X_k$, $Y_k$) is used for making multicarrier current decisions, and a set of differential quadrature components of the received carriers $dX_k$ and $dY_k$ are calculated according to equations (13);

b) using the decisions, the set of differential components $dX_k$ and $dY_k$ or the set of components $X_k$ and $Y_k$ are transformed into a set of reduced differential components $dX_{kr}$ and $dX_{kr}$ according to equations (14a) and (14b) or into a set of reduced components $X_{kr}$ and $X_{kr}$ according to equations (14c) and (14d);

c) the set of reduced differential components $dX_{kr}$ and $dY_{kr}$ or the set of reduced components $X_{kr}$ and $Y_{kr}$ are averaged to provide current estimates of the differential reference vector ($dX_r$, $dY_r$) according to equations (15a) and (15b) or of the reference vector ($X_r$, $Y_r$) according to equations (15c) and (15d);

d) based on estimates $dX_r$ and $dY_r$ or estimates $X_r$ and $Y_r$, corrected coordinates of the constellation points $X_{cn}$ and $Y_{cn}$ are calculated according to equations (17); and e) upgraded coordinates of the constellation points $X_{cn}$ and $Y_{cn}$, which are the same for all carriers, are used for making the next multicarrier decision.

Turning now to FIG. 8, a flow chart is provided which illustrates the above-described five step procedure of signal demapping and constellation points correction for multicarrier systems with correlated carrier phase shift, based on differential quadrature components of the carriers. It will be appreciated that the flow chart of FIG. 8 includes blocks 404-425 which are similar to blocks 204-425 described above with reference to FIG. 6. The difference between the two is that the system of FIG. 6 provides individual correction of the constellation for each carrier on the basis of averaging each carrier signals in the time domain, whereas the system of FIG. 8 provides a common constellation for all carriers on the basis of averaging carrier signals in the frequency domain.

It should be noted that in the case of correlated-carrier phase shifts, the disadvantage of the constellation point correction as opposed to received signal correction (i.e., the necessity of recalculating a large number of constellation points) is transformed into an advantage. More particularly, in the correlated-carrier phase shift case using signal correction, each carrier must be corrected during each symbol, i.e. the number of corrections per symbol is equal to the number of carriers K. In contrast, in the correlated-carrier phase shift case using constellation point correction, the corrected set of constellation points are common for all carriers, i.e. a number of correction is equal to constellation size "m". If m<K, constellation point correction requires less computation than algorithm signal point correction even when correction is carried out for each symbol. Besides, correction of constellation points can be provided once per n>1 symbols depending on how fast the phase is changing. Therefore, a mean number of corrections per symbol is equal to m/n, which is, as a rule, less than K in wireless systems.

According to another aspect of the invention, the basic algorithm in the case of the correlated-carrier phase shift may be further modified and simplified. The additional simplification is best understood with reference first to FIG. 9, where a 16-QAM constellation is depicted in (X,Y)-space. FIG. 9 shows two received vectors: received vector 1, and received vector 2. The vectors have the same phase shift relative to the constellation point (−3,3), but with opposite sign: +f and −f. Both received vectors provide the same decision; i.e., decision vector (−3,3). FIG. 9 shows differential vectors as differences between the received vectors and the decision vector. If the reference vector is (1,0), resulting reduced received vectors and reduced differential vectors will result as is indicated in FIG. 9, with corrected reference vectors 1 and 2, and reduced differential vectors 1 and 2. By reference to these vectors in FIG. 9, it can be seen that the sign of the Y-coordinates of the reduced differential vectors or corrected reference vectors is the same as the sign of the received vector's phase shift. In addition, the phase shift is proportional to the absolute value of the Y-coordinates of the vectors.

Based on these observations, a general simplified algorithm of phase tracking in a multicarrier system can be mathematically derived. Estimates of the Y-coordinates of the differential reference vector and the reference vector can be presented as follows:

$$dY_r = (A_0/K) * \sum_{k=1}^{K} (dY_k \cos\Delta_k + dX_k \sin\Delta_k)/a_k, \qquad (18a)$$

$$Y_r = (A_0/K) * \sum_{k=1}^{K} (Y_k \cos\Delta_k + X_k \sin\Delta_k)/a_k. \qquad (18b)$$

If the reference vector is (1,0), then the estimate (18a) is equal to (18b), and for small phase shift both of them are equal to the shift:

$$\phi \approx dY_r = Y_r. \qquad (19)$$

Given the above, a simplified method of carrier correction in multicarrier systems with correlated phase shift may be described as follows:

a) the received carriers are phase corrected by predetermined value $dY_r$ or $Y_r$ radians;

b) the set of corrected carriers is used for making multicarrier current decisions, and differential quadrature components of the corrected carriers $dX_k$ and $dY_k$ are calculated according to equations (13);

c) using the decisions, the set of differential quadrature components $dX_k$ and $dY_k$ or the set of quadrature components of the carriers $X_k$ and $Y_k$ are reduced and averaged according to equations (18); and d) upgraded estimates (18) are used for the next step of received carriers correction.

FIG. 10 shows a flow diagram of the simplified carriers correction algorithm. The carrier phase of the received multicarrier signal is first corrected at 602 by $dY_r$ radians. Then the corrected received signals are utilized for making a multicarrier decision at 604 according to equations (13), and the decision is fed to the hard decoder 606 and to the differential component calculation unit 608. The differential components are provided for channel estimation at 610 and the soft decoder 612. The multicarrier current decision 604 determines parameters of signal reduction $a_k$ and $\Delta_k$ which are stored in the parameters memory 614. Based on these parameters, the differential components of the received signals as determined by the differences calculation unit 608 are reduced at 616 and averaged at 618 (according to equation (18)) to provide a carrier phase correction signal which is fed back to the carrier phase correction block 602.

According to another aspect of the invention, the phase tracking algorithm for multicarrier systems with correlated between-carrier phase shifts is further simplified based on a "majority vote" approach. In this case the accumulations of terms in (18) are replaced by accumulation of their signs:

$$D_{+-} = \sum_{k=1}^{K} \text{Sign}(dY_k \cos\Delta_k + dX_k \sin\Delta_k) \quad (20a)$$

$$D_{+-} = \sum_{k=1}^{K} \text{Sign}(Y_k \cos\Delta_k + X_k \sin\Delta_k), \quad (20b)$$

where Sign( )=+1 or −1. The resulting integer $D_{+-}$ is a difference between the number of carriers with positive phase shifts and the number of carriers with negative phase shifts. This integer reflects a carrier "majority vote", and its sign determines a direction for common phase shift adjustment.

It should be noted that replacement of the terms of equations (18) by their signs in equations (20) provides some mitigation of the effect of wrong decisions, because in this case any wrong decision cannot dramatically change the result.

Additional robustness of the algorithm of equations (20) may be achieved by using a lower bound for majority votes; i.e., if the modulo of $D_{+-}$ is less than some predetermined threshold $T_d$, no corrections are provided. Threshold $T_d$ preferably depends on the number of carriers involved. System simulation shows that a threshold equal to 10% of all carriers participating in the adaptation process provides sufficient robustness of the system. For example, $T_d$=5 for WLAN according to the IEEE 802.11a standard.

Since integer $D_{+-}$ from equations (20) determines only a direction of common phase shift adjustment, it will be appreciated that it is also desirable to obtain a quantitative value for the phase shift adjustment.

According to another aspect of the invention, several methods of determining the phase shift value are provided. A first method comprises averaging projections of the carrier majority. According to this method, differential carrier projections or carrier projections are accumulated as in equations (18), but only for carriers which are from the majority votes. The resulting value is then divided by a number of majority carriers. For example, if the total number of carriers is equal to K, then the number of majority carriers is equal to $(K+|D_{+-}|)/2$. In other words, in this method the phase shift is corrected by the projections corresponding to the largest number of occasions. It should be noted that the method has shown good results in simulation.

A second method of determining phase shift value is based on assumption that the phase shift is small enough and can be efficiently corrected by changing carrier phases with a constant small increment. In this case, the phase adjustment algorithm should determine only a direction of the adjustment. In turn, the adjustment direction Sign(f) can be found as a sign of value $D_{+-}$ from equations (20):

$$\text{Sign}(\phi) = \text{Sign}\left(\sum_{k=1}^{K} \text{Sign}(dY_k \cos\Delta_k + dX_k \sin\Delta_k)\right) \quad (21a)$$

$$\text{Sign}(\phi) = \text{Sign}\left(\sum_{k=1}^{K} \text{Sign}(Y_k \cos\Delta_k + X_k \sin\Delta_k)\right). \quad (21b)$$

It should be noted that the method of changing carrier phases with a constant small increment is a simple one because it does not require phase shift calculation or a calculation of the number of majority votes. Its disadvantage, however, is that it is not as accurate in providing the constant increment over a wide range of phase shift changing.

Generally, the majority algorithm of phase tracking with constant increment may be described as follows:

a) all received carriers are phase corrected with some predetermined phase shift or with constant phase increment and with some predetermined sign;

b) the set of corrected carriers is used for making multicarrier current decisions ($X_{dk}$, $Y_{dk}$), and differential quadrature components of the carriers $dX_k$ and $dY_k$ are calculated according to equations (13);

c) using the decisions, the set of differential components $dX_k$ and $dY_k$ or the set of corrected components $X_k$ and $Y_k$ are reduced and then transformed into an integer $D_{+-}$ according to a majority vote algorithm (20);

d) if $D_{+-}$ is less than some predetermined threshold $T_d$, no phase correction is provided; otherwise the direction of phase correction is determined by a sign of $D_{+-}$, and the phase shift value is taken equal to either the average phase shift of the majority carriers or the predetermined constant increment; and e) the newly determined sign of phase adjustment and phase shift value are used in the next step of carrier phase correction.

FIG. 11 shows a flow diagram of the phase adjustment system. At 702 the carrier phase of the received multicarrier signal is first corrected with some predetermined phase shift or with a constant phase increment and with some predetermined sign. Then the corrected received signals are utilized for making a multicarrier decision at 704 and the decision is fed to the hard decoder 706 and to the differential component calculation unit 708. The differential components are provided for channel estimation at 710 and the soft decoder 712. The multicarrier current decision 704 determines a parameter of signal reduction $\Delta_k$ which is stored in the parameters memory 714. Based on this parameter, the differential components of the received signals as determined by the differences calculation unit 708 are reduced at 716, and at 718a a majority vote algorithm is utilized to provide integer $D_{+-}$ according to equation (20). At 718b a determination is made as to whether $D_{+-}$ is greater than (or equal to) some predetermined threshold $T_d$. If it is, the direction of phase correction is determined at 718c by a sign of $D_{+-}$, and the phase shift value is taken equal to either the average phase shift of the majority carriers or the predetermined constant increment. If the integer $D_{+-}$ is not greater than the predetermined threshold, than at 718d no phase correction is provided. The results of blocks 718c or 718d are fed back to block 702 for use in the next step of carrier phase correction.

It will be appreciated by those skilled in the art, that the above-described algorithms are based on signal correction in the frequency domain because they provide adjustment of carrier quadrature components, which, in their turn, are results of a FFT. This frequency domain approach, i.e. signal correction after FFT, completely solves carrier phase tracking problem in OFDM systems. However, with respect to frequency offset compensation, the frequency domain approach only partly solves the problem. The fact is that in the OFDM systems the frequency offset causes both carrier phase shifts and violation of carrier orthogonality. Violation of carrier orthogonality, in its turn, causes considerable intercarrier interference. The considered algorithms provide phase shift compensation but they cannot eliminate or mitigate the intercarrier interference. To the extent that the interference power is a monotonical function of the frequency offset, the offset compensation after FFT is efficient only for comparatively small frequency shifts.

In principle, the intercarrier interference may be compensated for in the frequency domain (after FFT) by means of interference cancellation techniques, based on decision feedback. However, this approach is complex, especially for OFDM systems with a large number of carriers.

Another approach is frequency offset compensation in the time domain before FFT. The time domain approach is attractive because, first, it allows the system to reestablish carrier orthogonality and avoid intercarrier interference, and, second, it may be simply implemented.

A general algorithm of frequency offset compensation in the time domain may be derived from the Discrete Fourier Transform theory: if the n-th complex sample of a signal, frequency shifted by $\Delta f$ Hz, is $S_n$, then the n-th sample of the unshifted signal is complex number $S_n \exp(-jn\phi)$, where $\phi = 2\pi\Delta fT$ and T is an FFT interval.

The phase shift $\phi$ in this algorithm corresponds to the phase shift estimate provided by the previously described algorithms for multicarrier OFDM systems, based on reducing and averaging differential quadrature components of the received carriers. General expressions for trigonometrical function of phase shift $\phi$ are provided by equations (6), where differential components $dX_r$ and $dY_r$ are calculated according to equations (15a) and (15b). A simplified algorithm of phase shift estimation can be also utilized to determine the phase shift $\phi$ for frequency offset compensation in time domain.

Turning now to yet another aspect of the invention, a per-carrier adaptive equalizer for multicarrier wireless systems is provided, and uses estimates of differential quadrature components of the reference vector.

As previously mentioned, the proposed method of carrier phase tracking can be utilized for adaptive equalization of received multicarrier signals. Generally, in multicarrier systems the equalizer function includes adjustment of amplitudes and phases of all received carriers to the corresponding reference signals (which are ideally the constellation points). As a rule, wireless systems have a special training signal (preamble), which is used for preliminary equalization of all carriers. At the end of preamble the equalizer is "frozen" and during the data transmission session each received carrier is equalized by means of convolution with some predetermined constant vector. For purposes herein, this preliminary equalizer will be called a "static equalizer", which emphasizes the fact that during data transmission it does not change equalization parameters. However, in channels with variable parameters, amplitudes and phases of the carriers fluctuate during the session, and the static equalizer does not provide perfect correction of the received signals. So in many cases, wireless systems require adaptive equalization during the communication session to provide perfect coherent signal processing. For purposes herein, the equalizer which implements the adaptive equalization is called a "dynamic equalizer", which emphasizes the fact that during data transmission it does adjust equalization parameters to the channel conditions.

Frequency offset compensation and phase shift tracking may be considered part of the adaptive equalization process. The corresponding algorithms, based on estimates of differential quadrature components of the reference vector, were considered above. According to this aspect of the invention, the same approach is taken for realization of the frequency equalizer function as a whole.

In particular, let $X_k$ and $Y_k$ be quadrature components of the k-th carrier at the output of the static equalizer; i.e., they are a preliminarily equalized received signal, corresponding to the k-th carrier. Further, assume that the equalized signal $(X_k, Y_k)$ has changed both its amplitude and phase compared to the initial equalization during the preamble. Now, if the k-th carrier phase shift is equal to $\phi_k$, then the phase-corrected coordinates of the k-th received carrier $X_{kc}$ and $Y_{kc}$ may be calculated as follows:

$$X_{kc} = X_k \cos \phi_k - Y_k \sin \phi_k, \quad (22a)$$

$$Y_{kc} = Y_k \cos \phi_k + X_k \sin \phi_k. \quad (22b)$$

The coordinate of equations (22) correspond to the proper rotation of the received vector without changing its amplitude.

Assume now that the relative change of the amplitude is equal to $\delta A_k$; in other words $\delta A_k$ is a ratio of the initial carrier amplitude to the new carrier amplitude. Then, phase and amplitude corrected (equalized) coordinates of the k-th received carrier $X_{ke}$ and $Y_{ke}$ may be calculated as follows:

$$X_{ke} = \delta A_k (X_k \cos \phi_k - Y_k \sin \phi_k), \quad (23a)$$

$$Y_{ke} = \delta A_k (Y_k \cos \phi_k + X_k \sin \phi_k). \quad (23b)$$

To provide equalization according to equations (23), values must be determined for $\delta A_k$ and $\phi_k$.

The carrier phase shift $\phi_k$ is equal to a current estimate of the phase difference between the reference vector and corrected (estimated) reference vector. Taking into account equations (6), trigonometrical functions of the phase shift $\phi_k$ can be derived as follows:

$$\sin \phi_k = (dX_{rk} * Y_0 - dY_{rk} * X_0)/B_k, \quad (24a)$$

$$\cos \phi_k = ((A_0)^2 + dX_{rk} * X_0 + dY_{rk} * Y_0)/B_k, \quad (24b)$$

where $dX_{rk}$ and $dY_{rk}$ are estimates of the differential quadrature components of the reference vector for the k-th carrier according to equations (4), $X_0$ and $Y_0$ are coordinates of the reference vector, $A_0$ is an amplitude of the reference vector, and $$B_k = A_0 * ((X_0 + dX_{rk})^2 + (Y_0 + dY_{rk})^2)^{0.5}. \quad (24c)$$

The amplitude ratio $\delta A_k$, in its turn, can be expressed through the estimate of the amplitude of the corrected reference vector. To the extent that corrected amplitude $A_c$ is equal to $$A_c = ((X_0 + dX_{rk})^2 + (Y_0 + dY_{rk})^2)^{0.5}, \quad (25)$$

then $$\delta i\ A_k = A_0/A_c = A_0/((X_0 + dX_{rk})^2 + (Y_0 + dY_{rk})^2)^{0.5}. \quad (26)$$

Substituting equations (26) and (24) into equation (23), the following equalization algorithm is obtained:

$$X_{ke} = \{1/((X_0 + dX_{rk})^2 + (Y_0 + dY_{rk})^2)\}\{((A_0)^2 + dX_{rk}X_0 + dY_{rk}Y_0)X_k - (dX_{rk}Y_0 - dY_{rk}X_0)Y_k\} \quad (27a)$$

$$Y_{ke} = \{1/((X_0 + dX_{rk})^2 + (Y_0 + dY_{rk})^2)\}\{((A_0)^2 + dX_{rk}X_0 + dY_{rk}Y_0)Y_k + (dX_{rk}Y_0 - dY_{rk}X_0)X_k\}, \quad (27b)$$

Expressions (27) are a general algorithm of the dynamic equalizer, which transforms the output of the static equalizer $(X_k, Y_k)$ into a completely equalized vector $(X_{ke}, Y_{ke})$.

It will be appreciated by those skilled in the art that equations (27) can be simplified by the proper choice of the reference signal (vector). If, for example, the reference signal has coordinates $X_0=1$ and $Y_0=0$, equations (27a) and (27b) reduce to the following simple expressions:

$$X_{ke}=R_k(X_k+(dX_{rk}X_k+dY_{rk}Y_k)), \quad (28a)$$

$$Y_{ke}=R_k(Y_k+(dX_{rk}Y_k-dY_{rk}X_k)), \quad (28b)$$

where $R_k=1/((1+dX_{rk})^2+dY_{rk}^2)$.

It can be seen that equations (28) differ from equations (8) with respect only to the amplitude coefficient $R_k$.

Algorithms (27) and (28) completely solve the problem of per-carrier equalization, but they have appear to have the disadvantage of two-step signal processing: i.e., in the first step the received signal is transformed into a preliminarily equalized vector $(X_k, Y_k)$, and in the second step the preliminarily equalized vector $(X_k, Y_k)$ is transformed into a finally equalized vector $(X_{ke}, Y_{ke})$. Actually, in this case the static and dynamic equalizers operate independently, and require double processing.

According to another aspect of the invention, the two-step signal processing disadvantage is overcome by combining static and dynamic equalization functions into a one-step adaptive procedure. For this purpose, the static equalizer algorithm will be considered in detail. In particular, the static equalizer, acting during the preamble, provides the receiver with equalization vector $(X_{kT}, Y_{kT})$ for the k-th carrier. This vector does not change during data transmission session. Static equalization consists in multiplication of the received k-th carrier vector $(X_{kR}, Y_{kR})$ and the equalization vector $(X_{kT}, Y_{kT})$. The result of this multiplication is the equalized vector $(X_k, Y_k)$, having components defined by:

$$X_k=X_{kT}X_{kR}-Y_{kT}Y_{kR}, \quad (29a)$$

$$Y_k=X_{kT}Y_{kR}+Y_{kT}X_{kR}. \quad (29b)$$

Substituting equations (29) into (27), the full equalization algorithm is obtained which combines static (preliminary) equalization and dynamic (adaptive) equalization.

Again, if the reference signal has coordinates $X_0=1$ and $Y_0=0$, the complete equalization algorithm reduces as follows:

$$X_{ke}=(R_k(X_{kT}+dX_{rk}X_{kT}+dY_{rk}Y_{kT}))*X_{kR}-(R_k(Y_{kT}+dX_{rk}Y_{kT}-dY_{rk}X_{kT}))*Y_{kR}, \quad (30a)$$

$$Y_{ke}=(R_k(X_{kT}+dX_{rk}X_{kT}+dY_{rk}Y_{kT}))*Y_{kR}+(R_k(Y_{kT}+dX_{rk}Y_{kT}+dY_{rk}X_{kT}))*X_{kR}. \quad (30b)$$

where $X_{kR}$ and $Y_{kR}$ are the quadrature components of the received, nonequalized k-th carrier signal, $X_{kT}$ and $Y_{kT}$ are components of the preliminary equalization vector (static vector) for the k-th carrier, $dX_{rk}$ and $dY_{rk}$ are estimates of the differential quadrature components of the reference signal for the k-th carrier, and $R_k=1/((1+dX_{rk})^2+dY_{rk}^2)$ is the estimate of the amplitude correction for the k-th carrier.

It should be appreciated that the values in the brackets of equations (30) are the corrected components of the equalization vector, and the combined static-dynamic equalization process involves the multiplication of the received k-th carrier vector $(X_{kr}, Y_{kR})$ and corrected equalization vector with components $$X_{kTc}=R_k(X_{kT}+dX_{rk}X_{kT}+dY_{rk}Y_{kT}), \quad (31a)$$

$$Y_{kTc}=R_k(Y_{kT}+dX_{rk}Y_{kT}-dY_{rk}X_{kT}). \quad (31b)$$

It should also be noted that components of the equalization vector (31) do not require correction with the symbol rate. In other words, they may be corrected, for example, once per S symbols, where S depends on speed of change of the channel parameters. At the i-th step of equalization, the current components $X_{kT}(i)$ and $Y_{kT}(i)$ are expressed through the previous (i–1)-th components according to the following recurrent formula:

$$X_{kT}(i)=R_k(X_{kT}(i-1)+dX_{rk}X_{kT}(i-1)+dY_{rk}Y_{kT}(i-1)), \quad (32a)$$

$$Y_{kT}(i)=R_k(Y_{kT}(i-1)+dX_{rk}Y_{kT}(i-1)-dY_{rk}X_{kT}(i-1)). \quad (32b)$$

Finally, the equalization algorithm as a whole can be represented using equations (30) through (32) as follows:

$$X_{ke}=X_{kT}(i)*X_{kR}-Y_{kT}(i)*Y_{kR}, \quad (33a)$$

$$Y_{ke}=X_{kT}(i)*Y_{kR}+Y_{kT}(i)*X_{kR}. \quad (33b)$$

Turning now to FIG. 12, a flow-chart is seen for implementing the preferred per-carrier adaptive equalizer of the invention. The equalizer is adapted for multicarrier wireless systems and utilizes estimates of differential quadrature components of a reference vector.

As seen in FIG. 12, the carrier vectors $(X_{kR}, Y_{kR})$ output from an FFT are equalized (corrected) at 830 by multiplication with the current equalization vector $(X_{kT}, Y_{kT})$ according to $$X_{ke}=X_{kT}*X_{kR}-Y_{kT}*Y_{kR}, \quad (34a)$$

$$Y_{ke}=X_{kT}*Y_{kR}+Y_{kT}*X_{kR} \quad (34b)$$

where $X_{ke}$ and $Y_{ke}$ are equalized (corrected) components of the received k-th carrier, and the transformation of equations (34) is carried out for all carriers k=1, 2, . . . , K, where K is the number of carriers of the multicarrier signal. The current equalization vector may be a predetermined equalization vector provided from the preamble training procedure (static equalization), or may be an equalization vector estimation from the previous step of adaptive procedure (dynamic equalization).

As was described previously, at 836 the equalized signals $(X_{ke}, Y_{ke})$ are utilized in the multicarrier demapper for making decisions $(X_{kd}, Y_{kd})$ which are typically constellation points nearest to the signals $(X_{ke}, Y_{ke})$ and which are typically fed to a hard decoder (not shown). Along with the decisions $(X_{kd}, Y_{kd})$, the demapper 836 generates parameters of signal reduction such as $\Delta_k$, $A_0$ and $a_k$ (or indications thereof such as $A_0/a_k$) which are stored in parameters memory 838. Differential quadrature components of the equalized carriers may then be calculated at 840 as follows:

$$dX_k=(X_{ke}-X_{kd}), \quad (35a)$$

$$dY_k=(Y_{ke}-Y_{kd}) \quad (35b)$$

and preferably fed to a soft decoder (not shown). The differential quadrature components of the received carriers $dX_k$ and $dY_k$ are then reduced at 844 according to the following reduction algorithm:

$$dX_{kred}=(A_0/a_k)(dX_k\cos\Delta_k-dY_k\sin\Delta_k), \quad (36a)$$

$$dY_{kred}=(A_0/a_k)(dY_k\cos\Delta_k+dX_k\sin\Delta_k), \quad (36b)$$

where $dX_{kred}$ and $dY_{kred}$ are the reduced differential quadrature components of the k-th carrier, $\Delta_k$ is the phase difference between the decision and reference vectors of the k-th carrier, $a_k$ is the amplitude of the decision vector of the k-th carrier, $A_0$ is the amplitude of the reference vector, and k=1, 2, . . . , K, where K is the number of carriers of the multicarrier signal.

Sequences of reduced differential quadrature components $dX_{kred}$ and $dY_{kred}$ for each carrier are then averaged at 846 separately for that carrier over an interval of N symbols according to:

$$dX_{rk} = (1/N)\sum dX_{kred}(j) \tag{37a}$$

$$= (A_0/N)\sum_{j=1}^{N}(dX_k(j)\cos\Delta_k(j) - dY_k(j)\sin\Delta_k(j))/a_k(j),$$

$$dY_{rk} = (1/N)\sum dY_{kred}(j) \tag{37b}$$

$$= (A_0/N)\sum_{j=1}^{N}(dY_k(j)\cos\Delta_k(j) + dX_k(j)\sin\Delta_k(j))/a_k(j)$$

where $dX_{rk}$ and $dY_{rk}$ are estimates of the differential quadrature components of the reference signal for the k-th carrier, $dX_k(j)$ and $dY_k(j)$ are the differential quadrature components of the k-th carrier at the j-th symbol, $\Delta_k(j)$ is the phase difference between the decision and reference vectors for the k-th carrier at the j-th symbol, and $a_k(j)$ is the amplitude of the decision vector of the k-th carrier at the j-th symbol.

Once sequences of reduced differential quadrature components are averaged for each carrier, a new equalization vector ($X_{kT}$, $Y_{kT}$) can be calculated at 850. The equalization vector depends on the reference vector, but for simplification purposes a reference vector (1,0) may be chosen such that the equalization vector can be calculated as follows:

$$X_{kT}(i) = R_k(X_{kT}(i-1) + dX_{rk}X_{kT}(i-1) + dY_{rk}Y_{kT}(i-1)), \tag{38a}$$

$$Y_{kT}(i) = R_k(Y_{kT}(i-1) + dX_{rk}Y_{kT}(i-1) - dY_{rk}X_{kT}(i-1)), \tag{38b}$$

where $X_{kT}(i)$ and $Y_{kT}(i)$ are components of the new equalization vector for the k-th carrier at the current i-th step of adaptation; $X_{kT}(i-1)$ and $Y_{kT}(i-1)$ are components of the equalization vector for the k-th carrier at the previous (i-1)-th step of adaptation, and $R_k = 1/((1+dX_{rk})^2 + dY_{rk}^2)$. The new equalization vector is then fed back to the carrier signals correction block 830 for correcting the Fourier transformed multicarrier signal according to equations (34a) and (34b).

It should be noted that the demapper and the differential components unit are not specific units of the proposed equalizer. They are typically used in any receiver. As it is indicated in FIG. 12, demapper output is fed to a hard decoder, and the differential components output is fed to a soft decoder.

It will be appreciated by those skilled in the art that the flow charts of FIGS. 5-8 and 10-12 may be implemented in hardware, software, firmware, dedicated circuitry or programmable logic, digital signal processors, ASICS, or any combination of them.

There have been described and illustrated herein several embodiments of a pilotless, wireless, telecommunications apparatus, systems and methods. While particular embodiments of the invention have been described, it is not intended that the invention be limited thereto, as it is intended that the invention be as broad in scope as the art will allow and that the specification be read likewise. Thus, with respect to all of the disclosed embodiments of the invention, while particular reference vectors have been disclosed, it will be appreciated that other reference vectors could be utilized as well. In addition, while particular mechanisms and criteria for unreliable symbol exclusion have been disclosed, it will be understood that other criteria and mechanisms can be used. Also, while embodiments of the invention have been shown in the drawings in flow-chart format with particular function blocks, it will be recognized that the functionality of various of the blocks could be split or combined without affecting the overall approach of the invention. Further, while the invention was disclosed with reference to both a hard decoder and a soft decoder, it will be appreciated that the receiver need not include both a hard and a soft decoder, and that one or the other will suffice. Thus, the current decision could be sent to the soft decoder. It will therefore be appreciated by those skilled in the art that yet other modifications could be made to the provided invention without deviating from its spirit and scope as claimed.

What is claimed is:

1. A method for equalizing a multicarrier wireless telecommunications data signal, comprising:
   a) receiving the multicarrier wireless telecommunications data signal without accompanying pilot signals;
   b) extracting per-carrier phase and amplitude adjustment information from the multicarrier wireless telecommunications data signal by reducing and averaging differential quadrature components of said multicarrier wireless telecommunications data signal;
   c) processing said per-carrier phase and amplitude adjustment information in order to obtain equalization indications; and
   d) equalizing said multicarrier wireless telecommunications data signal by modifying indications of said wireless telecommunications data signal using said equalization indications.

2. A method according to claim 1, wherein:
said indications of said wireless telecommunications signal are Fourier transformed indications ($X_{kR}$, $Y_{kR}$),
said equalization indications are equalization vectors ($X_{kT}(i)$, $dY_{kT}(i)$) where i is an index of equalization steps, and
said modifying indications of said wireless telecommunications signal comprises correcting said Fourier transformed indication with said estimates of equalization vectors to obtain corrected Fourier transformed indications $X_{ke}$ and $Y_{ke}$ for k=1,2, ... K where K is the number of carriers of said multicarrier signal.

3. A method according to claim 2, wherein:
said equalization vectors are obtained by calculating differences between said corrected Fourier transformed indications $X_{ke}$ and $Y_{ke}$ and closest constellation point values to provide differential quadrature components of the corrected received signal $dX_k$ and $dY_k$, reducing said differential quadrature components to obtain reduced differential components $dX_{red}$, $dY_{red}$, averaging sequences of said reduced differential components to provide estimates of the differential quadrature components of the reference signal for the k-th carrier $dX_{rk}$ and $dY_{rk}$, and using said estimates of the differential quadrature components to obtain said equalization vectors.

4. A method according to claim 3, wherein:
said reducing is accomplished according to $$dX_{red} = (A_0/a_k)(dX_k \cos\Delta_k - dY_k \sin\Delta_k),$$

$$dY_{red} = (A_0/a_k)(dY_k \cos\Delta_k + dX_i \sin\Delta_k),$$

where $dX_{red}$ and $dY_{red}$ are reduced differential quadrature components of the k-th carrier, $A_0$ is an amplitude of a reference vector, $a_k$ is an amplitude of a decision vector for a k-th carrier, and $\Delta_k$ is a phase difference between a decision vector and a reference vector for the k-th carrier.

5. A method according to claim 4, wherein:
said averaging is accomplished according to $$dX_{rk} = (1/N)\sum dX_{kred}(j)$$
$$= (A_0/N)\sum_{j=1}^{N} (dX_k(j)\cos\Delta_k(j) - dY_k(j)\sin\Delta_k(j))/a_k(j),$$

$$dY_{rk} = (1/N)\sum dY_{kred}(j)$$
$$= (A_0/N)\sum_{j=1}^{N} (dY_k(j)\cos\Delta_k(j) + dX_k(j)\sin\Delta_k(j))/a_k(j)$$

where $dX_{rk}$ and $dY_{rk}$ are averaged estimated differential quadrature components for the k-th carrier, $dX_k(j)$ and $dY_k(j)$ are differential quadrature components of the k-th carrier at the j-th symbol, $D_k(j)$ is the phase difference between the decision and reference vectors for the k-th carrier at the j-th symbol, $a_k(j)$ is the amplitude of the decision vector of the k-th carrier at the j-th symbol, and N is the number of symbols being averaged.

6. A method according to claim 5, wherein:
said using said estimates of the differential quadrature components to obtain said equalization vectors is accomplished according to $$X_{kT}(i) = R_k(X_{kT}(i-1) + dX_{rk}X_{kT}(i-1) + dY_{rk}Y_{kT}(i-1)),$$
$$Y_{kT}(i) = R_k(Y_{kT}(i-1) + dX_{rk}Y_{kT}(i-1) - dY_{rk}X_{kT}(i-1)),$$

where $X_{kT}(i)$ and $Y_{kT}(i)$ are said estimates of equalization vectors for the k-th carrier at a current i-th step of adaptation, $X_{kT}(i-1)$ and $Y_{kT}(i-1)$ are estimates of the equalization vector for the k-th carrier at a previous (i−1)-th step of adaptation, and $R_k = 1/((1+dX_{rk})^2 + dY_{rk}^2)$.

7. A method according to claim 6, wherein:
said reference vector is (1,0).

8. A method according to claim 6, wherein:
said modifying is accomplished according to $$X_{ke} = X_{kT}*X_{kR} - Y_{kT}*Y_{kR},$$
$$Y_{ke} = X_{kT}*Y_{kR} + Y_{kT}*X_{kR}.$$

9. A method according to claim 2, wherein:
said modifying is accomplished according to $$X_{ke} = X_{kT}*X_{kR} - Y_{kT}*Y_{kR},$$
$$Y_{ke} = X_{kT}*Y_{kR} + Y_{kT}*X_{kR}.$$

10. A telecommunications apparatus, comprising:
a receiver which receives a multicarrier wireless telecommunications data signal without accompanying pilot signals, said receiver including an equalizer, said equalizer including means for extracting per-carrier phase and amplitude adjustment information from the multicarrier wireless telecommunications data signal by reducing and averaging differential quadrature components of the received multicarrier wireless telecommunications data signal, for processing said per-carrier phase and amplitude adjustment information in order to obtain equalization indications, and for equalizing said multicarrier wireless telecommunications data signal by modifying indications of said wireless telecommunications data signal using said equalization indications.

11. A telecommunications system, comprising:
a first telecommunications apparatus including a transmitter which transmits a wireless telecommunications data signal without accompanying pilot signals; and
a second telecommunications apparatus including a receiver which receives said wireless telecommunications data signal, said receiver including an equalizer, said equalizer including means for extracting per-carrier phase and amplitude adjustment information from the multicarrier wireless telecommunications data signal by reducing and averaging differential quadrature components of the received multicarrier wireless telecommunications data signal, for processing said per-carrier phase and amplitude adjustment information in order to obtain equalization indications, and for equalizing said multicarrier wireless telecommunications data signal by modifying indications of said wireless telecommunications data signal using said equalization indications.

* * * * *